(12) United States Patent
Jacobs

(10) Patent No.: US 7,459,893 B2
(45) Date of Patent: Dec. 2, 2008

(54) OPTIMAL FEEDBACK CONTROL OF SWITCH-MODE POWER CONVERTERS

(76) Inventor: Mark E Jacobs, 7615 Applecross La., Dallas, TX (US) 75248

( * ) Notice: Subject to any disclaimer, the term of this patent is extended or adjusted under 35 U.S.C. 154(b) by 98 days.

(21) Appl. No.: 11/735,274

(22) Filed: Apr. 13, 2007

(65) Prior Publication Data

US 2007/0247129 A1  Oct. 25, 2007

Related U.S. Application Data

(60) Provisional application No. 60/793,459, filed on Apr. 20, 2006.

(51) Int. Cl.
  *G05F 1/575* (2006.01)
  *G05F 1/618* (2006.01)
(52) U.S. Cl. .................................... 323/282
(58) Field of Classification Search ............... 323/222, 323/223, 224, 265, 282, 283, 284, 351
  See application file for complete search history.

(56) References Cited

U.S. PATENT DOCUMENTS

| | | | |
|---|---|---|---|
| 4,378,585 | A | 3/1983 | Bete |
| 4,456,872 | A | 6/1984 | Froeschle |
| 5,019,958 | A * | 5/1991 | Varga et al. .................. 363/97 |
| 5,138,250 | A * | 8/1992 | Capel ......................... 323/283 |
| 5,770,940 | A | 6/1998 | Goder |
| RE36,098 | E | 2/1999 | Vinciarelli |
| 6,147,478 | A | 11/2000 | Skelton et al. |
| 6,229,292 | B1 | 5/2001 | Redl et al. |
| 6,249,447 | B1 | 6/2001 | Boylan et al. |
| 6,366,070 | B1 | 4/2002 | Cooke et al. |
| 6,465,993 | B1 | 10/2002 | Clarkin et al. |
| 6,791,306 | B2 | 9/2004 | Walters et al. |

OTHER PUBLICATIONS

Chattopadhyay, S. "Analysis of Limit Cycle Oscillations in Digital Current-Mode Control," Applied Power Electronics Conference, Mar. 19, 2006, pp. 480-486, IEEE.

Di Blasi, G.M., et al., "A Novel Linear-Non-Linear Digital Control for DC/DC Converter with Fast Transient Response," Applied Power Electronics Conference, Mar. 19, 2006, pp. 705-711, IEEE.

Garcea, G., et al., "Digital Auto-Tuning System for Inductor Current Sensing in VRM Applications," Applied Power Electronics Conference, Mar. 19, 2006, pp. 493-498, IEEE.

(Continued)

*Primary Examiner*—Gary L Laxton

(57) ABSTRACT

A power converter including a power switch, an output filter, and a controller. The output filter receives a switched input voltage and produces a filtered power converter output characteristic represented by a state vector. A controller coupled to the power switch and the output filter estimates the state vector of the output filter and controls the power switch by partitioning a state-vector plane into a first region and a second region employing a line passing through a desired output characteristic. The controller turns the power switch on when the estimated state vector lies in the first region and off when it lies in the second region. The steady-state switching frequency of the power converter is controlled by offsetting a state-vector component at a desired switching frequency. To estimate the state vector of the output filter, the controller may advantageously be coupled to the switched input voltage.

18 Claims, 20 Drawing Sheets

OTHER PUBLICATIONS

Goder, D., et al., "$V^2$ Architecture Provides Ultra-Fast Transient Response in Switch Mode Power Supplies," Proceedings of HFPC Power Conversion, 1996, 5 pp.

Pontryagin, L. S., et al., "The Mathematical Theory of Optimal Processes," $2^{nd}$ printing, 1963, pp. 22-27, John Wiley & Sons.

Qiu, Y., "High-Bandwidth Designs for Voltage Regulators with Peak-Current Control," Applied Power Electronics Conference, Mar. 19, 2006, pp. 24-30, IEEE.

Redl, R., et al., "Optimizing the Load Transient Response of the Buck Converter," Applied Power Electronics Conference, Feb. 15, 1998, pp. 170-176, IEEE.

Sobolev, L. B., "Optimal Control of Transients in DC/DC Converters," Power Conversion Conference, Yokohama, Japan, Apr. 19, 1993, pp. 194-199, IEEE.

Song, C., et al., "High-Accuracy Hysteretic Current-Mode Regulator for Powering Microprocessors," Applied Power Electronics Conference, Mar. 19, 2006, pp. 506-509, IEEE.

Soto, A., et al., "Analysis of the Buck Converter for Scaling the Supply Voltage of Digital Circuits," Eighteenth Annual IEEE Applied Power Electronics Conference and Exposition, vol. 2, Feb. 9, 2003, 7 pp., IEEE.

Soto, A., et al., "Non-Linear Digital Control Breaks Bandwidth Limitations," Applied Power Electronics Conference, Mar. 19, 2006, pp. 724-730, IEEE.

* cited by examiner

OPTIMAL FEEDBACK CONTROL OF SWITCH-MODE POWER CONVERTERS

CROSS REFERENCE TO RELATED APPLICATION

This application claims the benefit of U.S. Provisional Application No. 60/793,459, entitled "Optimal Feedback Control Of Switch-Mode Power Converters," filed on Apr. 20, 2006, which is incorporated herein by reference.

TECHNICAL FIELD

The present invention is directed, in general, to power electronics and, in particular, to a controller for a power converter and method of operating the same.

BACKGROUND

Early designs of power converters were based on dissipative circuit elements such as bipolar transistors that regulated an output characteristic such as output voltage by controlling the voltage drop across an active circuit element. A circuit element sustaining a substantial voltage drop inherently results in a power converter with generally low power conversion efficiency. To produce substantial efficiency improvements, switch-mode technologies were developed in the 1970s (and earlier) that regulated the output characteristic by adjusting a duty cycle of a switch that is controlled to be either fully on or fully off. In parallel with the introduction of switch-mode circuit topologies, control arrangements were developed to provide precise regulation of an output characteristic by feeding back a signal with an error amplifier to control the switch based on a linearized model of the switch-mode power train that "averages" the switching effects. Such control arrangements generally operate with a clocked, periodic triangular waveform and an error amplifier coupled to an output characteristic of the power converter. The switch in the power converter is turned on at the beginning of each clocked waveform cycle, and remains on until the clocked triangular waveform exceeds an output signal from the error amplifier.

Switch-mode power trains combined with a clocked signal to turn a power switch on have become an industry mainstay, providing excellent and cost-effective results for steady-state operation. Linearized models of switch-mode power trains controlled by such arrangements are generally useful at frequencies substantially below the power converter switching frequency, at frequencies typically lower by an order of magnitude, but they have not provided a necessary response at frequencies near the power converter switching frequency. Recent applications of power converters to loads with abruptly changing power requirements, such as microprocessors that require a step change in a bias voltage or a step change in load current, have challenged the ability of such feedback arrangements to provide a suitably rapid power converter response time.

Roughly in parallel with the development of switch-mode power converters has been extensive research in the field of mathematical optimization in areas such as linear programming, dynamic programming, and the general theory of optimal processes. These developments focus on performance metrics for a system that are generally measured over a time interval, and may explicitly include constraints on an operating parameter of the system such as a limit for the magnitude of a control signal. The performance of a system controlled using a mathematical optimization criterion can far exceed performance obtainable with ordinary feedback control, and is not limited by the familiar control considerations such as phase and gain margins at crossover frequencies. A limiting drawback of such mathematical optimization approaches has been the extensive computation necessary to produce a control signal, especially for a system of modest complexity such as a power supply. The application of control approaches using mathematical optimization has generally been limited to complex systems with critical performance metrics that do not have the cost constraints of high volume, low cost products for a commercial market. Attempts to improve a response of a power converter to abrupt changes in load conditions have generally resulted in a complex and bandlimited control arrangement. A need thus exists for a controller for a power converter that can provide a substantially optimal control signal for an optimization criterion such as a minimum-time objective with sufficient simplicity that it can be implemented with a practical, low-cost circuit arrangement. The controller must be quickly responsive to substantial changes in an output characteristic of the power converter, and, in addition, provide precise steady-state control. A further need is for a controller that can estimate the output state of a power converter with sufficiently fast response time and accuracy so that its rapid response is not compromised. The controller must quickly respond with accuracy to substantial changes in an output characteristic of the power converter without significant lag in an estimate of the output characteristic.

SUMMARY OF THE INVENTION

These and other problems are generally solved or circumvented, and technical advantages are generally achieved, by advantageous embodiments of the present invention which include a power converter and a method of operating the same. The power converter includes a power switch and an output filter coupled to the power switch to receive a switched input voltage and produce a filtered output characteristic of the power converter. In a preferred embodiment, the power converter is a switch-mode power converter. In a preferred embodiment, the power converter further includes a controller coupled to the power switch and to the output filter, wherein the controller estimates a state vector of the output filter lying in a state-vector plane and controls the power switch employing a partition of the state-vector plane. In a preferred embodiment, the partition separates the state-vector plane into a first region and a second region, wherein the controller produces a control signal to turn the power switch on when the state vector lies in the first region, and to turn the power switch off when the state vector lies in the second region. In a further preferred embodiment, when the state vector lies in the second region the controller produces a control signal to turn on an auxiliary switch of the power converter. In a preferred embodiment, the first region and the second region are complementary regions. In a further preferred embodiment, the state vector estimated by the controller includes state-vector components representing other circuit elements of the power converter such as other inductors and capacitors.

In one embodiment, the partition is represented by ellipses. In a further preferred embodiment, the partition is represented by a nonlinear function such as a quadratic function. In a further preferred embodiment, the partition is represented by a straight line or by other functional representations known in the art.

In a preferred embodiment, the partition passes through a point representing a desired output characteristic of the power converter. In a further preferred embodiment, the partition includes a time-delayed component of the state vector to produce a delayed response of the controller for a control signal. In a preferred embodiment, the time-delayed component is produced by adding a component of a state vector multiplied by a factor to another state-vector component. In a further preferred embodiment, the factor is chosen to control a switching frequency of the power converter.

In a further preferred embodiment, the partition includes a component of the state vector offset with a waveform having a desired switching frequency of the power converter. In a preferred embodiment, the offsetting waveform is a triangular waveform function of time with a period corresponding to a desired switching frequency of the power converter. In a further preferred embodiment, the offsetting waveform is a sinusoidal waveform function of time, with a period equal to a desired period of a switching frequency of the power converter. In a further preferred embodiment, the offsetting waveform may be other periodic functions of time with a period related to a desired switching frequency of the power converter.

In a preferred embodiment, the partition represents or approximates a state-vector trajectory of the power converter that results from integrating backward in time a differential equation representing principal dynamic elements of the power converter with a control signal set to a control limit. In a preferred embodiment, the partition is produced by setting the control signal to values of a control limit to form a plurality of partition segments. In a preferred embodiment, partition segments are joined at a substantially common point in the state-vector plane.

In a further preferred embodiment, the controller includes a model-referenced filter that estimates a state vector of the output filter. In a preferred embodiment, the model-referenced filter is coupled to the switched input voltage coupled to the output filter to model the time-varying evolution of the state vector. In a preferred embodiment, the model-referenced employs a reference waveform input signal representing a sensed component of the state vector to correct the time-varying modeled evolution of the state vector. In a further preferred embodiment, the model-referenced filter estimates the switched input voltage coupled to the output filter to model the time-varying evolution of the state vector.

In a further preferred embodiment, a power converter includes a power switch and an output filter coupled to the power switch to receive a switched input voltage and produce a filtered output characteristic of the power converter. The power converter further includes a controller coupled to the power switch and to the output filter. In a preferred embodiment, the controller is coupled to the switched input voltage coupled to the output filter wherein the controller estimates a state vector of the output filter and controls the output characteristic of the power converter by controlling the power switch. In a preferred embodiment, the controller models the time-varying evolution of the state vector using the switched input voltage coupled to the output filter. In a preferred embodiment, the controller employs a reference waveform input signal representing a sensed component of the state vector of the output filter to correct the time-varying modeled evolution of the state vector. In a further preferred embodiment, the controller estimates the switched input voltage coupled to the output filter rather than sensing it.

Another embodiment of the present invention is a method of controlling a power converter including a power switch and an output filter coupled to the power switch to receive a switched input voltage and produce a filtered output characteristic of the power converter. In a preferred embodiment, the power converter is a switch-mode power converter. In a preferred embodiment, the method includes coupling a controller to the power switch and to the output filter, and estimating a state vector of the output filter lying in a state-vector plane, and controlling the power switch by partitioning the state-vector plane. In a preferred embodiment, the method includes separating the partition of the state-vector plane into a first region and a second region, and producing a control signal to turn the power switch on when the state vector lies in the first region, and to turn the power switch off when the state vector lies in the second region. In a further preferred embodiment, the method includes producing a control signal to turn on an auxiliary switch of the power converter when the state vector lies in the second region. In a preferred embodiment, the method includes forming the first region and the second region as complementary regions. In a further preferred embodiment, the method includes estimating a state vector and including components in the state vector of other circuit elements of the power converter such as inductors and capacitors.

In one embodiment, the method includes representing the partition by ellipses. In a further preferred embodiment, the method includes representing the partition by nonlinear functions such as quadratic functions. In a further preferred embodiment, the method includes representing the partition by a straight line or other functional representations known in the art.

In a further embodiment, the method includes forming the partition so that it passes through a point representing a desired output characteristic of the power converter. In a further preferred embodiment, the method includes forming the partition with a time-delayed component of the state vector to produce a delayed response of the controller for a control signal. In a preferred embodiment, the method includes producing the time-delayed component by adding a component of a state vector multiplied by a factor to another state-vector component. In a further preferred embodiment, the method includes choosing the factor to control a switching frequency of the power converter.

In a further preferred embodiment, the method includes offsetting a component of the state vector in the partition with a waveform having a desired switching frequency of the power converter. In a preferred embodiment, the method includes using a triangular waveform function of time with a period corresponding to a desired switching frequency of the power converter for the offsetting waveform. In a further preferred embodiment, the method includes using a sinusoidal waveform function of time with a period equal to a desired period of a switching frequency of the power converter for the offsetting waveform. In a further preferred embodiment, the method includes using other periodic functions of time with a period related to a desired switching frequency of the power converter for the offsetting waveform.

In a preferred embodiment, the method includes using results from integrating backward in time a differential equation representing principal dynamic elements of the power converter with a control signal set to a control limit for a partition representing or approximating a state-vector trajectory of the power converter. In a preferred embodiment, the state-vector trajectories of the power converter are optimal trajectories. In a preferred embodiment, the method includes producing the partition by setting the control signal to values of a control limit to form a plurality of partition segments. In a preferred embodiment, the method includes joining partition segments at a substantially common point in the state-vector plane.

In a further preferred embodiment, the method includes estimating a state vector of the output filter with a model-referenced filter in a controller. In a preferred embodiment, the method includes coupling the controller to the switched input voltage that is coupled to the output filter to model the time-varying evolution of the state vector. In a preferred embodiment, the method includes employing a reference waveform input signal representing a sensed component of the state vector in the output filter to correct the time-varying modeled evolution of the state vector. In a further preferred embodiment, the method includes estimating the switched input voltage that is coupled to the output filter to model the time-varying evolution of the state vector.

The foregoing has broadly outlined the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIG. 3 illustrates regions in the state plane of a power converter controlled by an embodiment of a controller of the present invention to attain a desired output voltage in minimum time, showing regions wherein a main or an auxiliary switch is turned on;

DETAILED DESCRIPTION OF ILLUSTRATIVE EMBODIMENTS

Figure 1:
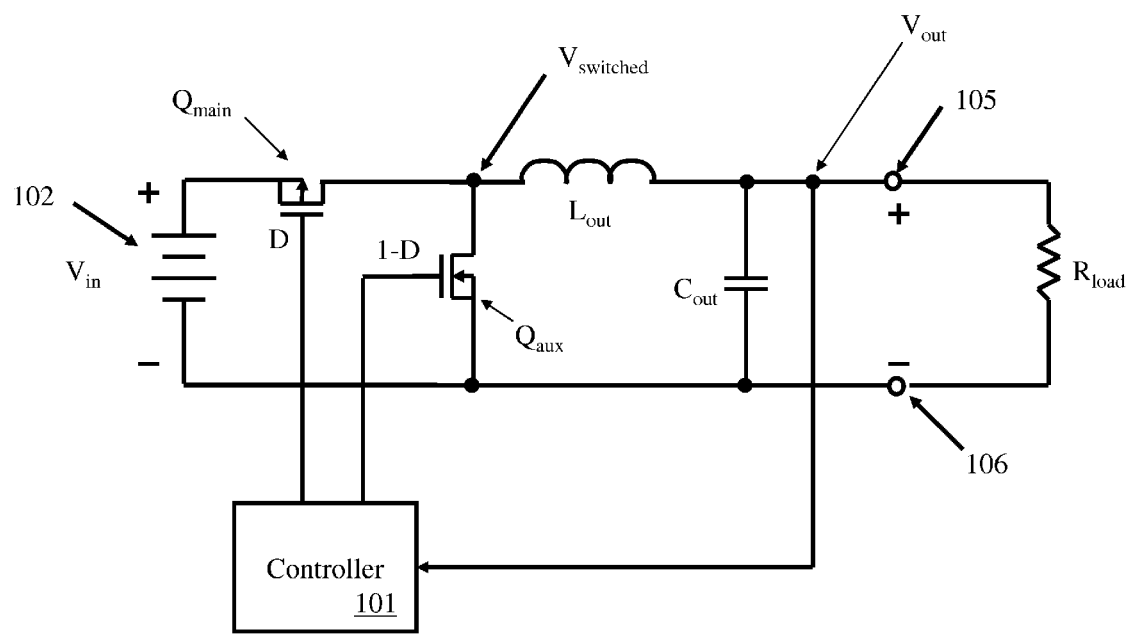
FIG. 1 illustrates a simplified schematic diagram of a buck switching regulator of the prior art controlled by a controller.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, a controller for a power converter that can produce a control signal for the power converter that can transition a characteristic of the power converter such as an output voltage to a desired characteristic in substantially minimum time. A filter in the controller will be described with respect to preferred embodiments in a specific context, namely, a model-referenced filter that can provide a state-vector estimate for an output characteristic of a switch-mode power converter without substantial lag in the state-vector estimate. A state-vector estimate generally includes a vector with at least two components, each component of which (or combinations of which) represents a state of an energy-storage element of a power converter.

The application of a control approach to a system such as a switching regulator using mathematical programming as described hereinbelow can be performed with substantial simplification of the resulting equations that would not normally be expected from applying such a mathematical approach to a controller. Key circuit elements that affect the state vector for a switching regulator include the inductor and capacitor forming the output filter, which are substantially linear circuit elements dominated by first-order dynamic characteristics. The control constraint for a switch-mode supply can be translated into the voltage applied to the output filter, which is typically either the input voltage or zero volts for a buck switching regulator, or is an easily derived voltage for other circuit topologies. The resulting control equations are sufficiently modest after simplification without the need for transcendental functions such as exponentials and logarithms or other higher order functions that they can be economically implemented with digital signal processing, with an analog circuit, or with a combination thereof.

To illustrate the application of mathematical programming to a switch-mode power supply in an embodiment of the present invention, a dynamic programming approach is described for an exemplary nonisolated buck switching regulator powered from an input voltage source, powering a load with an abruptly varying load voltage and which draws current with abrupt changes in current level. The same approach can be applied without limitation to other power conversion arrangements such as a full-bridge topology as well as other nonisolated circuit arrangements well known in the art.

Without repeating the detailed mathematical steps that are well understood in the field of dynamic programming and other mathematical optimization processes, the solution for a system controlled with a performance metric such as a minimum-time objective with a control limit can be found using a backward search process from a desired end-point condition. The backward search process computes the optimal response, the state-vector trajectory, and the resulting performance metric for state-vector points prior to and adjacent to the end-point condition. The process continues by recursively computing the optimal response, etc., for state-vector points on a surface one step back in time from the previous points, and continues to move the solution surface back in time until the initial state of the system has been reached. The result of such extensive computation, even for a linear system with a quadratic or minimum time metric and a control limit, generally is to provide a control signal at a control limit with minimal control changes for substantially the entire state-vector trajectory. A control signal at a control limit is recognized as corresponding to a power switch in a power converter being either fully on or fully off. A power switch in the power converter being either fully on or fully off is the ordinary mode of operation for a controlled switch in a switch-mode circuit topology. Of course, other techniques well known in the art can be used to construct an optimal state-vector trajectory terminating at a desired end-point condition.

Illustrated in FIG. 1 is a circuit diagram for an exemplary nonisolated buck switching regulator, controlled by controller 101. The power train includes output filter inductor $L_{out}$, and output filter capacitor $C_{out}$. The power train is powered from an input voltage source 102, supplying input voltage $V_{in}$ represented in the figure by a battery. Switches $Q_{main}$ and $Q_{aux}$ alternately couple the output filter inductor $L_{out}$ to the input voltage source or to ground potential. The power train produces output voltage $V_{out}$ that powers a load represented by resistor $R_{load}$ coupled to the output terminals 105 and 106 of the power converter. The operation of a switch-mode power train such as illustrated in FIG. 1 is well understood in the art and will not be repeated in the interest of brevity.

Figure 2:
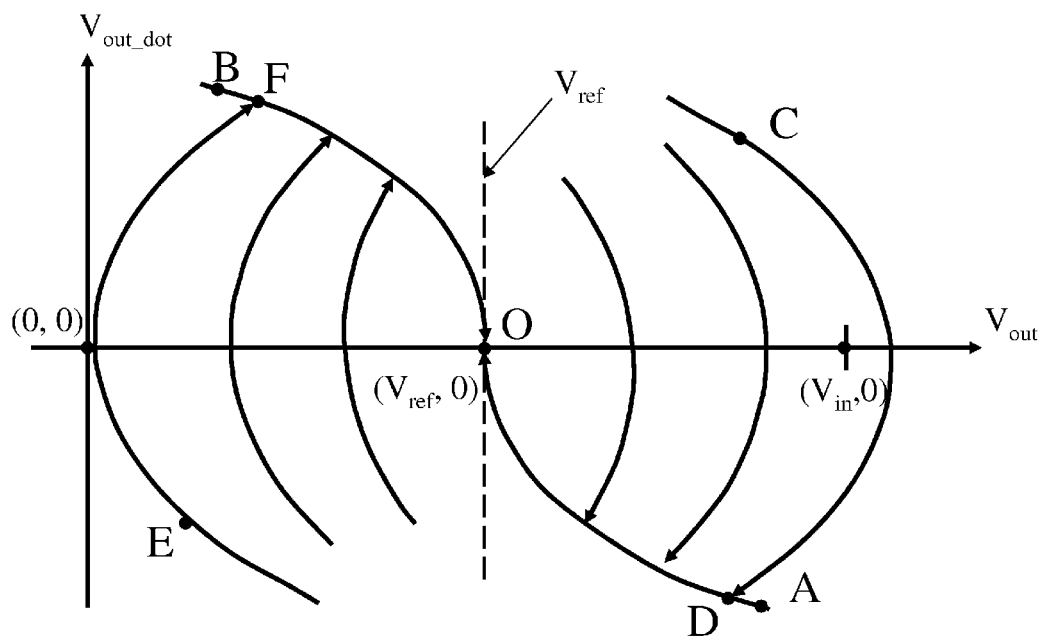
FIG. 2 illustrates optimal state-plane trajectories of a power converter controlled by an embodiment of a controller of the present invention to attain a desired output voltage in minimum time.

Turning now to FIG. 2, illustrated is a state-space representation of optimal output voltage trajectories of a power converter such as illustrated in FIG. 1 when the output voltage $V_{out}$ of the power converter is controlled to attain in minimum time the desired voltage $V_{ref}$ with zero time derivative, represented by the point O. A state-space representation of a power converter with an output filter including an inductor and a capacitor such as illustrated in FIG. 1 requires representation of at least two state-space vector components. The trajectory illustrated in FIG. 2 can be constructed using methods of mathematical programming well known in the art. Of course, approximations to optimal state-vector trajectories can also be represented within the broad scope of the invention.

One state-vector component is the output voltage $V_{out}$, corresponding to the voltage across the output filter capacitor $C_{out}$. The other state-vector component in this exemplary representation is the derivative with respect to time of the output voltage, represented in FIG. 2 by $V_{out\_dot}$. The origin of the coordinate system is the point (0, 0).

The time-dependent behavior of the output voltage of the power converter can be represented by the following two equations, ignoring here the ESR (effective series resistance) of the output capacitor:

$$C \cdot \frac{dV_{out}}{dt} = i_L - \frac{V_{out}}{R_{load}} \tag{1}$$

$$L_{out} \cdot \frac{di_{out}}{dt} = V_{switched} - V_{out} \tag{2}$$

Combining equations (1) and (2) above produces the first-order vector linear differential equation (3) below that represents the time-dependent behavior for the output voltage of the switching regulator illustrated in FIG. 1:

$$\frac{d}{dt}\begin{bmatrix} V_{out} \\ V_{out\_dot} \end{bmatrix} = \begin{bmatrix} 0 & 1 \\ \frac{-1}{L_{out} \cdot C_{out}} & \frac{-1}{R_{load} \cdot C_{out}} \end{bmatrix} \cdot \begin{bmatrix} V_{out} \\ V_{out\_dot} \end{bmatrix} + \begin{bmatrix} 0 \\ \frac{V_{switched}}{L_{out} \cdot C_{out}} \end{bmatrix} \tag{3}$$

In equations (2) and (3), the parameter $V_{switched}$ represents the voltage at the node labeled $V_{switched}$ at the left side of the output inductor $L_{out}$ as illustrated in FIG. 1. When the switch $Q_{main}$ is enabled to conduct, the voltage at this node is $$V_{switched} = V_{in}, \tag{4}$$

and when the switch $Q_{aux}$ is enabled to conduct in a complementary fashion, the voltage at this node is $$V_{switched} = 0 \tag{5}$$

A minimum-time performance metric A can be chosen as follows for the power train represented by equation (3), controlled subject to the constraints represented by equations (4) and (5):

$$\int_{t_A}^{t_B} dt = A. \tag{6}$$

In equation (6), the limits of integration, $t_A$ and $t_B$, represent, respectively, initial and end times for the system represented by equation (3) to be controlled to reach an end state wherein the output voltage $V_{out}$ equals a desired reference voltage $V_{ref}$, and the derivative of the output voltage $V_{out\_dot}$ equals zero.

The objective of the mathematical optimization problem is to select a time-dependent function for the voltage $V_{switched}$ that minimizes the performance metric A represented by equation (6). As described hereinbelow, the voltage $V_{switched}$ can be controlled using a closed-loop feedback arrangement dependent on the sensed or otherwise estimated values of the state-vector components $V_{out}$ and $V_{out\_dot}$.

As described by L. S. Pontryagin, et al., in the book entitled, "The Mathematical Theory of Optimal Processes," John Wiley & Sons, 1963, second printing, pp. 22-27, the control signal for an optimally controlled linear system with control limits is set to control limits. For a switch-mode power converter, these control limits are interpreted herein to represent a fully on or fully off condition of a power switch as the state vector is controlled to approach the desired end point.

The optimal state-vector trajectories can be constructed by setting the control signal at each of the control limits, and integrating the differential equations representing the power converter state variables backwards in time beginning at the desired end point. Illustrated in FIG. 2 are two such trajectories, trajectories AO and BO, which are curved trajectories terminating on the exemplary state-space point O=($V_{ref}$, 0), the point O representing a constant output voltage of $V_{ref}$ volts. The trajectory AO with the directional sense indicated by its end arrow is produced from the constraint represented by equation (4). Similarly, the trajectory BO is produced from the constraint represented by equation (5). The particular trajectories AO and BO illustrated in FIG. 2 were constructed assuming an infinite load resistance coupled across the output terminals of the power converter. The state-vector trajectories for infinite load resistance $R_{load}$ are ellipses passing through the desired end-point voltage, which can be readily demonstrated recognizing the absence of an energy dissipating element in the circuit in view of the assumption of infinite load resistance. Relaxing the assumption of infinite load resistance produces spirals in place of ellipses. The use of ellipses for a power converter provides sufficiently accurate optimal control signals for numerous practical applications. Including a finite load resistance produces trajectories that can be easily represented with a corrective approximation to the equations below. Trajectories that are only approximately optimal can provide sufficiently accurate control response for a power converter because small variations of trajectories from optimal do not substantially affect a performance criterion such as measured by a minimum-time performance measure.

An equation for the state-vector trajectory which is a portion of an ellipse that includes the trajectory AO for a desired end-point voltage $V_{ref}$ and an input voltage $V_{in}$ is $$(V_{out} - V_{in})^2 + L_{out} \cdot C_{out} \cdot (V_{out\_dot})^2 = (V_{ref} - V_{in})^2. \quad (6)$$

For the state-vector ellipse including the trajectory BO, an equation for the state-vector trajectory is $$(V_{out})^2 + L_{out} \cdot C_{out} \cdot (V_{out\_dot})^2 = (V_{ref})^2. \quad (7)$$

Similarly, state-vector trajectories such as the trajectories CA and EF are portions of ellipses (assuming infinite load resistance) representing optimal paths to reach the trajectories AO and BO. Thus, FIG. 2 illustrates a map of the optimal state-vector trajectories that transfer the output voltage from any point in the state space to the desired end-point condition ($V_{ref}$, 0) for the circuit illustrated in FIG. 1. For example, the output voltage of the power converter beginning at the point C ideally follows the elliptical trajectory CD for which the switch $Q_{main}$ is disabled to conduct. Upon the state vector reaching the trajectory AO at the point D, the switch $Q_{main}$ is turned on, causing the output voltage ideally to follow the trajectory DO. At the point O, the output voltage $V_{out}$ is at the desired voltage $V_{ref}$, and $V_{out\_dot}$ is zero.

The trajectories AO and BO illustrated in FIG. 2 are thus ellipses in the idealized case wherein the resistance of the load is infinite and the resistance of reactive and other circuit elements can be ignored. When these resistances are finite, the trajectories AO and BO are elliptical spirals. These various curved trajectories can be approximated with nonlinear functions such as quadratic or other functional approximations, including a sequence of straight line ("linear") or higher order segments. The trajectories AO and BO lie in the second and fourth quadrants of the illustrated state-vector plane of $V_{out}$ and $V_{out\_dot}$, i.e., the signs of $V_{out}$ and $V_{out\_dot}$ are of opposite signs in these quadrants. In a limiting but practical approximation, the trajectories AO and BO are represented with a single straight line in the state-vector plane. A partition with positive slope can potentially lead to an unstable control response. It is recognized, nonetheless, that a complete stability analysis requires consideration of all dynamic elements of the system, including damping elements such as circuit resistances. A partition with negative slope can be used to provide a limit-cycle response, accommodating a limit cycle at a switching frequency at a desired steady-state operating point, which is consistent with the illustrated shape of the trajectories AO and BO. Thus, a curved partition which is substantially vertical near a desired end point and which curves to the left in the upper half plane and to the right in the lower half plane can provide a desirable control response for a circuit such as that illustrated in FIG. 1.

Figure 3:
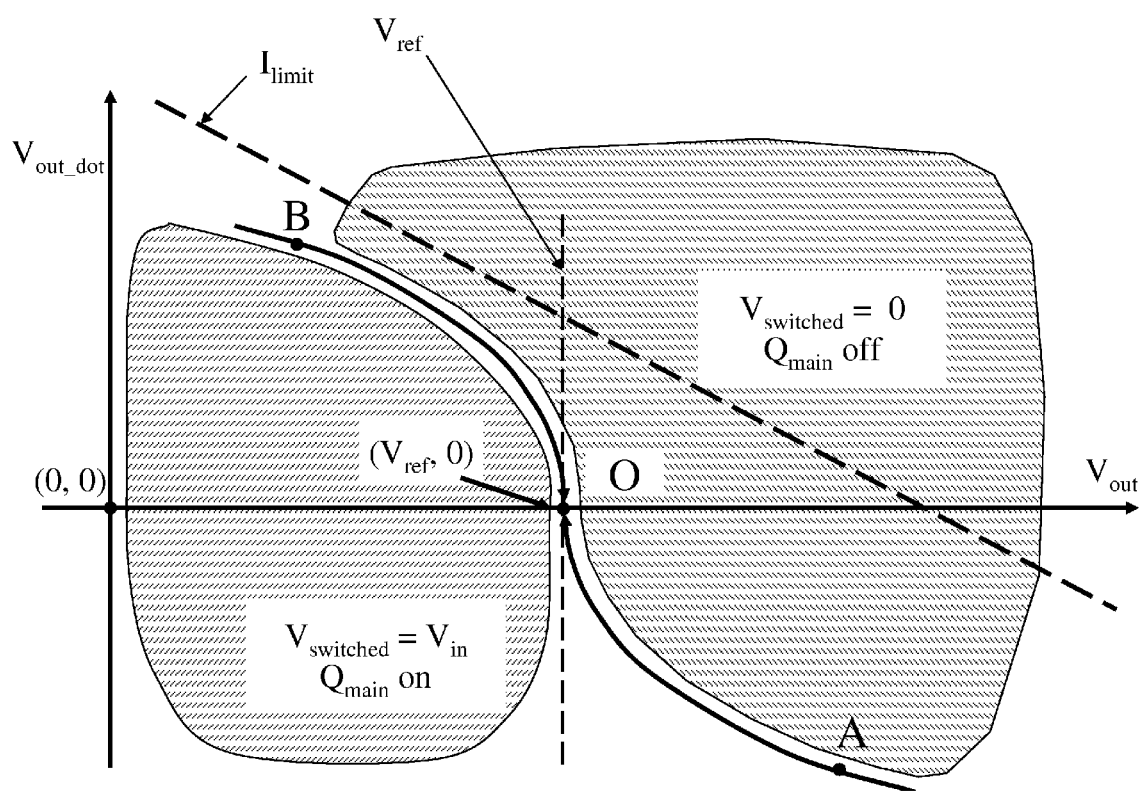

As illustrated in FIG. 3, the map of optimal state-vector trajectories illustrated and described with reference to FIG. 2 can be converted to a corresponding map of optimal control signals. When the state vector falls in the region immediately to the right of the line AOB, the optimal control signal turns off the switch $Q_{main}$, and turns on the switch $Q_{aux}$ (preferably after a small switching delay) applying zero volts to the output filter. Similarly, when the state vector falls in the region immediately to the left of the line AOB, the optimal control signal turns on the switch $Q_{main}$ and turns off the switch $Q_{aux}$, (again, preferably with appropriate switching delay) applying $V_{in}$ volts to the output filter. (For graphical/illustrative purposes, these two regions in FIG. 3 are not shown "immediately" to the left and "immediately" to the right of the line AOB, which would hide the curved line AOB.) Elements in FIG. 3 (as in other figures) with the same reference designation used in a previous figure are similar elements and will not be redescribed in the interest of brevity. Thus, the controller of the present invention does not ordinarily operate in the sense of the prior art wherein a power switch is periodically enabled to conduct with a clock signal for a controllable fraction of a switching period using a voltage ramp and a controllable voltage threshold, creating thereby a "duty cycle" and a "switching frequency." Nonetheless, the operational concept of a duty cycle must still be considered when performing "steady-state" control, for example, during a period of time when the output voltage is substantially constant or slowly varying.

A control law implementing this control process for the upper half-plane where $V_{out\_dot} > 0$ can be constructed using the function $$f_U = [(V_{out})^2 + L_{out} \cdot C_{out} \cdot (V_{out\_dot})^2 - (V_{ref})^2]. \quad (8)$$

For the lower half-plane where $V_{out\_dot} < 0$ the control law can be constructed using the function $$f_L = -[(V_{out} - V_{in})^2 + L_{out} \cdot C_{out} \cdot (V_{out\_dot})^2 - (V_{ref} - V_{in})^2] \quad (9)$$

The function $f_U$ or $f_L$ is selected depending on the sign of $V_{out\_dot}$. If the sign of $f_L$ or $f_U$ is negative for a particular point in the state-space plane representing the output of the power converter, then the switch $Q_{main}$ is closed; otherwise, the switch $Q_{main}$ is opened. The switch $Q_{aux}$ is controlled in a complementary fashion to the switch $Q_{main}$, with appropriate dead time between their conduction intervals, as is well understood in the art for switch pairs coupled to voltage sources. Thus, examining either the sign of the function $f_L$ or the function $f_U$ depending on the sign of $V_{out\_dot}$ produces an optimal control process for any point in the state-vector plane represented in FIG. 3. The sign of the function $f_U$ or $f_L$ indicates whether a state-vector lies within or outside the respective state-vector ellipse.

Equations (8) and (9) can be combined in a preferred embodiment to form a control law represented by the function f in equation (10) below that is operational in both portions of the state-vector plane. In equation (10) the sign function sign(·) is +1 for a positive or zero argument, and −1 otherwise. The unit step function u(·) has the value +1 for a positive or zero argument, and zero otherwise. Functions such as the sign function and the unit step function can be easily implemented with simple logic in digital or analog systems as is well known in the art. When the function f is negative for a particular output condition of the power converter, then the switch $Q_{main}$ is closed; otherwise, the switch $Q_{main}$ is opened. Again, the switch $Q_{aux}$ is controlled in a complementary fashion to the switch $Q_{main}$, with appropriate dead time between their conduction intervals:

$$f = \text{sign}(V_{out\_dot}) \cdot [(V_{out} - V_{in} \cdot u(-V_{out\_dot}))^2 + L_{out} \cdot C_{out} \cdot (V_{out\_dot})^2 - (V_{ref} - V_{in} \cdot u(-V_{out\_dot}))^2]. \quad (10)$$

Figure 4:
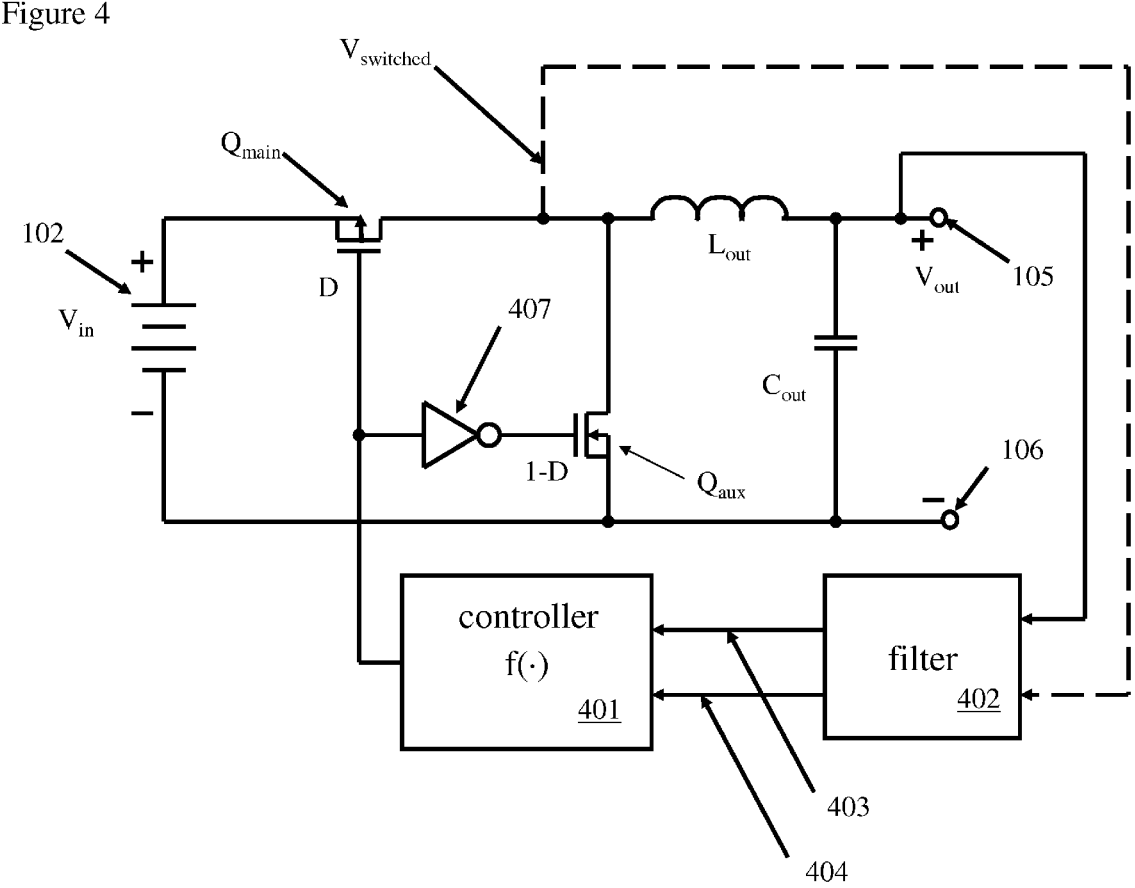
FIG. 4 illustrates a simplified schematic drawing of a buck switching regulator controlled by an embodiment of a controller of the present invention.

A closed-loop controller for the buck regulator illustrated in FIG. 1 can be constructed from equations (8) and (9) or from equation (10), as illustrated in FIG. 4, in a preferred embodiment of the invention. The block 401 represents a controller that implements an optimal control process (or an approximation thereto) such as the process represented above by equation (10). The block 402 represents a model-referenced filter with outputs 403, 404 representing, respectively, an estimate of the output voltage of a power converter and its derivative with respect to time. The coupling of the filter 102 to the voltage $V_{switched}$ at the left side of the inductor $L_{out}$ as illustrated with reference to FIG. 4 will be described later hereinbelow with reference to FIG. 10. Element 407 in the figure represents an inverter.

Estimation of the derivative of the output voltage $V_{out\_dot}$ can be performed by employing a network in parallel with the output filter capacitor (constructing thereby an "observer" for the capacitor current or, alternatively, the derivative with respect to time of the capacitor voltage) as is well-known in the art. See, for example, U.S. Pat. No. 6,249,447, "System and Method for Determining Output Current and Converter Employing the Same," which is hereby referenced and incorporated herein, for an exemplary circuit arrangement for an observer to produce an estimate of current in the output filter capacitor of a power converter. An estimate of the derivative with respect to time of the output voltage can be made from an estimate of the current in the output filter capacitor by dividing the estimated filter capacitor current by the value of the filter capacitance. An estimate of the derivative of the output voltage $V_{out\_dot}$ can be filtered as necessary with a low-pass filter or preferably with a filter as described later hereinbelow to limit possible noise content of this signal with consideration of the delay introduced by the selection of a filter time constant as discussed further hereinbelow. Other techniques are generally known in the art to estimate the derivative of the output voltage or, equivalently, the current in the output capacitor.

Figure 5:
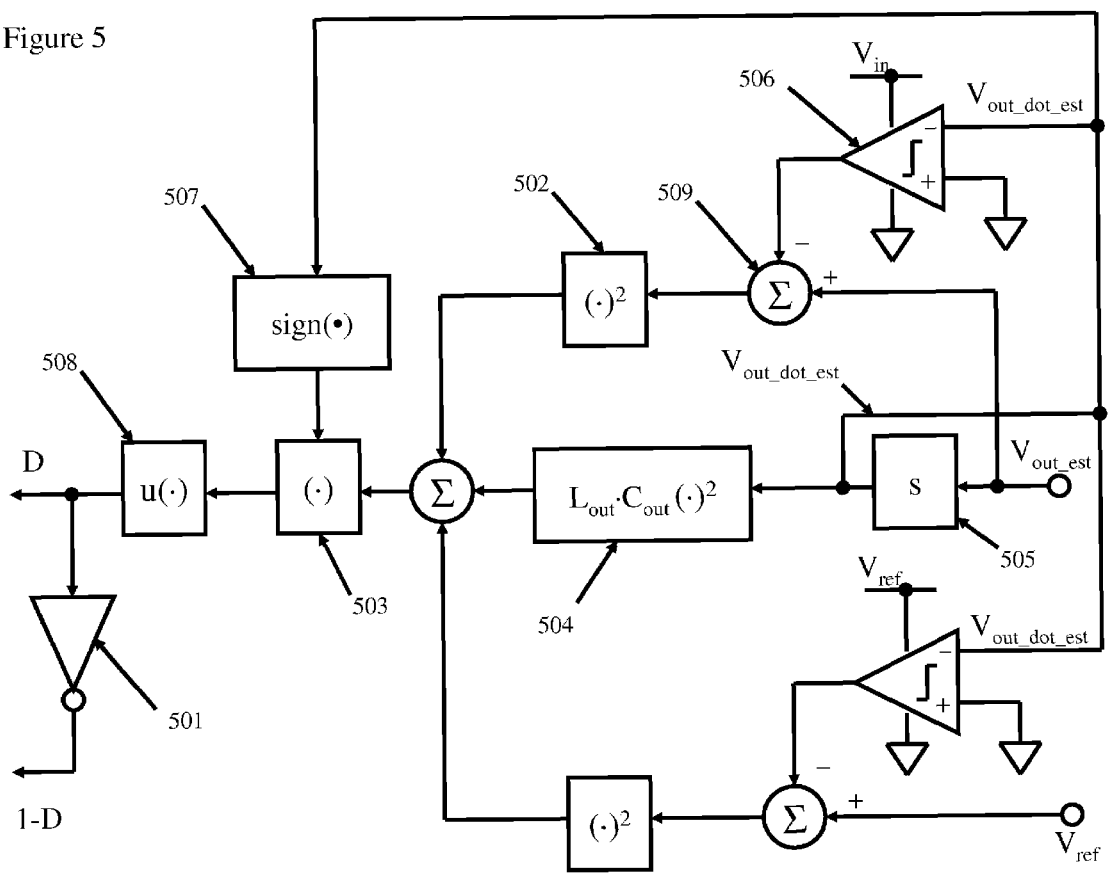
FIG. 5 illustrates a schematic drawing of an embodiment of a controller of the present invention.

A circuit representation for the function f employing adders, squarers, comparators, and the sign and step functions is illustrated in FIG. 5. FIG. 5 includes inverter 501, squarers such as 502, multipliers such as 503, amplifying squarer 504, differentiator 505 (represented by the Laplace radian frequency variable "s"), comparators such as 506, the sign function 507, the step function 508, and adders such as 509. The desired end-point voltage is $V_{ref}$. The arithmetic processes represented in FIG. 5 are of low digital complexity and can be readily implemented in an inexpensive digital circuit such as a DSP, ASIC, FPGA, etc., or even directly with an analog circuit. No operation requires extended numerical computation such as division or the implementation of other higher order functions. Semiconductor circuits that perform four-quadrant analog multiplication of two signals are well known in the art. See, for example, the book by P. Gray and R. Meyer, entitled "Analysis and Design of Analog Integrated Circuits," John Wiley & Sons, 1984, Second Edition, page 593. For another example, the Analog Devices, Inc., AD834 integrated circuit performs four-quadrant analog multiplication of two analog signals.

It is not essential that the functions represented by equations (8), (9), and (10) precisely represent the optimal state-space trajectory to transfer an output characteristic of a power converter to a desired end point. An imperfect trajectory such as a straight line can produce a control signal sequence for a power converter that transfers an output characteristic to a desired end point in substantially minimum time or to satisfy another optimization criterion. The equations representing an optimal state-vector trajectory can be represented by various nonlinear functions, including a sequence of straight-line approximations or a tabular lookup arrangement. The equations can include a representation of the current delivered to a load. A high level of complexity is generally unnecessary in a representation of these equations. It is recognized within the broad scope of the present invention that the foci of the ellipses as well as a desired end point can be offset from the axis of the state vector plane to adjust a control response to accommodate nonidealities of a power converter.

The control structure and process described hereinabove can be modified to include steady-state control for a substantially constant or slowly varying end-point voltage $V_{out}$ with a "switching frequency." A functional delay factor δT is introduced multiplying a state-variable component such as $V_{out\_dot}$ for the sensed output voltage $V_{out}$ to produce a steady-state limit cycle about a desired end point such as the end point ($V_{ref}$, 0), or for and generally maintaining stability at an end-point voltage. For example, if the term containing $V_{out}$ in equation (10) is replaced by the difference $V_{out} - δT \cdot V_{out\_dot}$ to include a small delay factor δT such as 250 ns for a 250 kHz switching frequency, then the controller can provide substantially steady-state operation with a limit cycle about a desired end-point condition such as the point ($V_{ref}$, 0), as illustrated by equation (11) below:

$$f = [\text{sign}(V_{out\_dot})] \cdot [(V_{out} - δT \cdot V_{out\_dot} - V_{in} \cdot u(-V_{out\_dot}))^2 + L_{out} \cdot C_{out} \cdot (V_{out\_dot})^2] \quad (11)$$

The delay factor δT can be implemented in conjunction with an "adder" (to provide subtraction of terms) and a gain multiplier for the state-variable $V_{out\_dot}$. An equivalent process can be represented by a small-angle coordinate rotation (or an approximation therefor) of the function f (or, equivalently, the functions $f_U$ and $f_L$) in the state-vector plane. Alternative mechanisms to provide a steady-state limit cycle at a desired end point can include other offsets from the state variable $V_{out}$ such as a constant offset dependent on the sign of a state-vector component, or an offset including further dynamic elements such as a frequency-dependent filter. A further mechanism to prevent high-frequency switching and/or to establish a switching frequency includes performing the control computation at a multiple of a desired switching frequency. Another mechanism is to include a process with positive feedback to provide hysteresis (and equivalents), such as positive feedback around a comparator performing a comparison operation. Accordingly, a partition of a state-vector plane can be sensed with a process including hysteresis. Dynamic elements ("poles" and "zeros") can be included as necessary with a functional delay to accommodate nonideal effects in the feedback process such as the ESR ("effective series resistance") of the output capacitor. An adjustable delay factor δT can be included to provide correction of the switching frequency for different operating conditions. Including hysteresis in the determination of the control signal and/or enabling control at periodic intervals (such as periodically at 4 μs for a power converter with a desired switching frequency of 250 kHz) can also be used to prevent "switch bounce" effects for the control signal at decision points along a state-vector trajectory. The inclusion of a delay factor δT can be viewed as a rotation of the coordinate system of the state-vector plane, or as a displacement of the foci of the ellipses from the coordinate axes.

Figure 6:
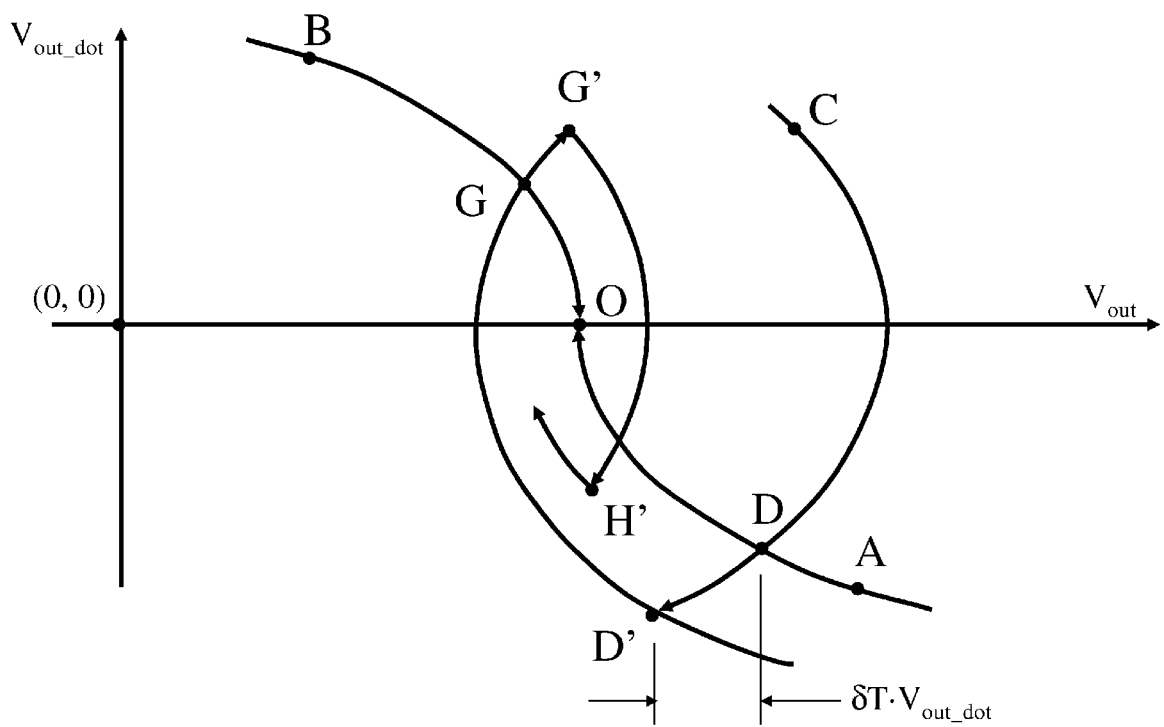
FIG. 6 illustrates a representation of the state plane of a power converter controlled by a controller constructed according to the principles of the present invention, showing state-vector trajectories encircling a desired end-point voltage.

FIG. 6 illustrates the effect in the state-vector plane of including a delay factor δT in the controller produced by adding the state-vector component $V_{out\_dot}$ multiplied by the delay factor δT to the state-vector component $V_{out}$. The trajectory CD now overshoots the point D, arriving at the point D'. The state vector representing the output voltage of the power converter follows the trajectory D'G, overshooting the point G, arriving at the point G', and continues, arriving at the point H'. A limit cycle encircling the desired end point ($V_{ref}$, 0) is produced with a small ripple voltage, effectively producing thereby a "switching frequency" for the power converter for steady-state operation.

Another mechanism to provide a steady-state limit cycle modulates the sensed output voltage $V_{out}$ used by the controller with an added signal such as a triangular waveform function with a period equal to (or related to) a desired steady-state switching frequency. The signal can be introduced by means other than addition such as a multiplicative effect or other mechanism, which may be linear or nonlinear. For example, an additive mechanism can be functionally incorporated into equation (10) by replacing the term $V_{out}$ with the sum $V_{out}$+ tri($f_s \cdot t$), for a switching frequency $f_s$, where the function tri ($f_s \cdot t$) is a triangular waveform function with a period with the desired switching frequency $f_s$, preferably with bipolar amplitude of about a percent, i.e. millivolts for a nominal output voltage about 1 volt, or with other amplitude as appropriate for the application. Functions other than a triangular waveform can also be used to produce a controlled switching frequency such as sinusoidal and rectangular waveforms. A combination of an added triangular waveform function and a delay factor δT as described above can provide a robust structure for controlling the steady-state switching frequency for a practical power converter application.

Noise and various forms of jitter can be included, for example, in the delay factor, the added waveform, and/or other mechanisms to provide a random timing element for a power switch during steady-state power converter operation. Random switch timing spreads the spectrum of noise generated by the power converter, which may be useful to meet EMI requirements for the power converter or for the system in which it is embedded.

Figure 7:
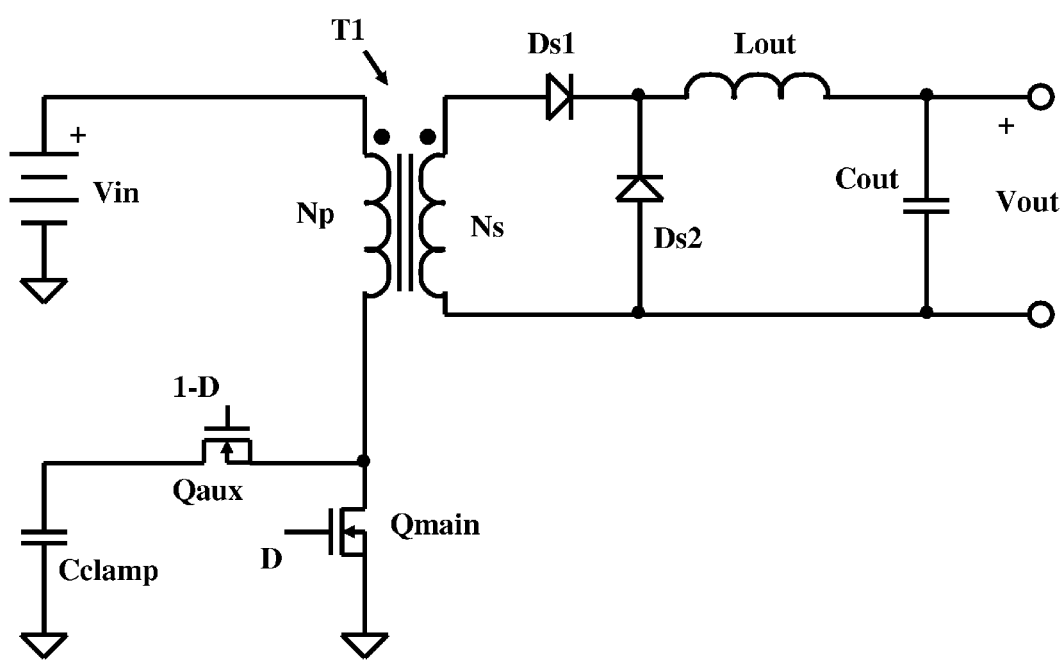
FIG. 7 illustrates an active-clamp forward converter of the prior art.

FIG. 7 illustrates a simplified schematic drawing for an active-clamp forward converter of the prior art that can be controlled with the feedback process of the present invention such as represented by equation (10). The circuit includes clamp capacitor $C_{clamp}$, transformer T1 with primary and secondary windings Np and Ns, and rectifying diodes Ds1 and Ds2. Remaining circuit elements are similar to those described with reference to FIG. 1. When the main switch $Q_{main}$ is turned on, the voltage at the node $V_{switched}$ is the input voltage $V_{in}$ scaled by the secondary-to-primary turns ratio of the transformer Ns/Np. When the switch $Q_{aux}$ is turned on, the voltage at the node $V_{switched}$ is substantially zero, similar to the operation of the nonisolated buck converter described with reference to FIG. 1. The detailed operation of the active clamp circuit is well understood in the art and will not be described further in the interest of brevity. See, for example, U.S. Pat. RE36,098 entitled "Optimal Resetting of the Transformer's Core in Single-Ended Forward Converters," which is hereby referenced and incorporated herein. Thus, an active clamp forward converter can be controlled to follow optimal output voltage trajectories using a controller substantially similar to that described above for a nonisolated buck converter. It is recognized that a walk-in or other control strategy may be necessary for start-up operation of this power converter to manage the voltage of the clamp capacitor and in-rush currents as is well known in the art.

If the secondary winding of the isolation transformer in an active clamp forward converter is tapped and grounded, then the variable $V_{switched}$ in equation (10) preferably represents the nonzero voltage coupled to the output filter inductor when the auxiliary switch $Q_{aux}$ coupled to the primary of the power transformer is turned on. Modifications to the control structure to recognize a nonzero voltage coupled to the output filter during such a portion of a switching cycle can be readily made within the broad scope of the present invention.

It is recognized that the control signal for a power switch does not change over a substantial period of time when the state vector of the output filter lies a substantial distance from the partition of the state vector plane. In such cases a controller need not immediately compute a new control signal for a power switch, thereby presenting an opportunity to reduce a computational load on a control circuit.

In a preferred embodiment of the invention, a controller for a power converter includes a model-referenced filter that estimates an output state-vector of the power converter with little time-lag in the estimate. Filters that include substantial time lag can result in control system instability. In a preferred embodiment, the filter provides estimates of state-vector components of the power converter that are temporally aligned with corresponding power converter state-vector components.

Figure 8:
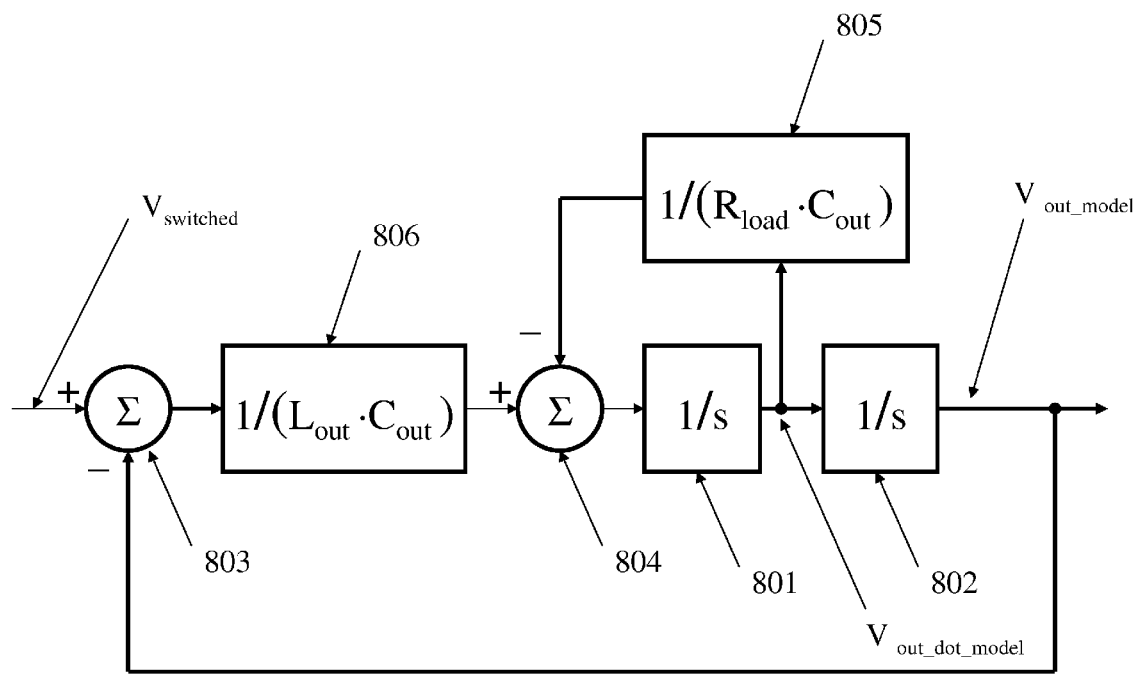
FIG. 8 illustrates a model for the output state vector of a power converter, constructed according to the principles of an embodiment of the invention.

To produce a filter with little or insubstantial time lag, a model is constructed for the dynamic output characteristics of the power converter. An exemplary mode is illustrated in FIG. 8, including integrators 801 and 802, represented in the figure by the reciprocal of the Laplace transform complex radian frequency variable "s". The model (ignoring load resistance here for simplicity) represents the equation $$\frac{d^2 V_{out\_model}}{dt^2} = \left(\frac{1}{L_{out} \cdot C_{out}}\right) \cdot (V_{switched}). \tag{12}$$

The input signal to the model is the time-varying voltage $V_{switched}$ at the left node of the output inductor $L_{out}$, as described hereinabove with reference to FIG. 4. The input signal is divided by the product $L_{out} \cdot C_{out}$ and integrated once in integration block 801 to model the time derivative of the output voltage $V_{out\_dot\_model}$. It is integrated a second time in integration block 802 to model the output voltage $V_{out\_model}$. The representation of the process illustrated in FIG. 8 can be derived from the circuit equations representing the output filter, and will not be reproduced in the interest of brevity.

The output signal $V_{out\_est}$ of a model and the intermediate signal $V_{out\_dot\_model}$ are produced by integration as described above, thereby including inherent drift over time from the actual values of the associated state-vector components of the power converter due to imperfect integration. To be useful, this drift in a preferred embodiment of the invention is continually corrected over time.

Figure 9:
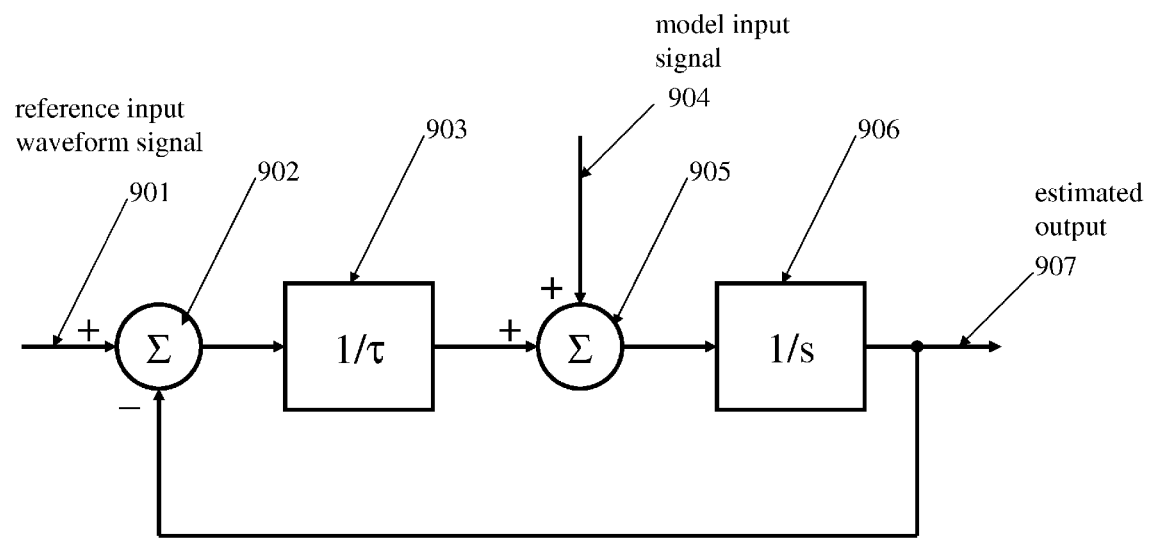
FIG. 9 illustrates a model correction structure to provide continual correction of a modeled signal, constructed according to the principles of an embodiment of the invention.

FIG. 9 illustrates a model correction structure, in a preferred embodiment of the invention, to provide continual correction of a modeled signal so that it can accurately track a state-vector component, producing thereby an estimated state-vector component. The model input signal is provided at node 904, which is coupled through summer 905 to integrator 906, producing thereby a signal at node 907 representing the estimated corrected output. The drift introduced by integrator 906 is sensed by comparing the signal at node 907 to a reference waveform input signal at node 901. The error is amplified with gain $1/\tau$ in block 903, and then summed with the model input signal in summer 905. The parameter $\tau$ in block 903 represents a correction time constant, such as several microseconds, for the overall process. The parameter $\tau$ would be selected based on the rate of drift introduced by integrator 906. A small value for the parameter $\tau$ would be selected for a high rate of integrator drift. A larger value would be selected to desensitize the overall process to noise superimposed on the input signal 901.

Figure 10:
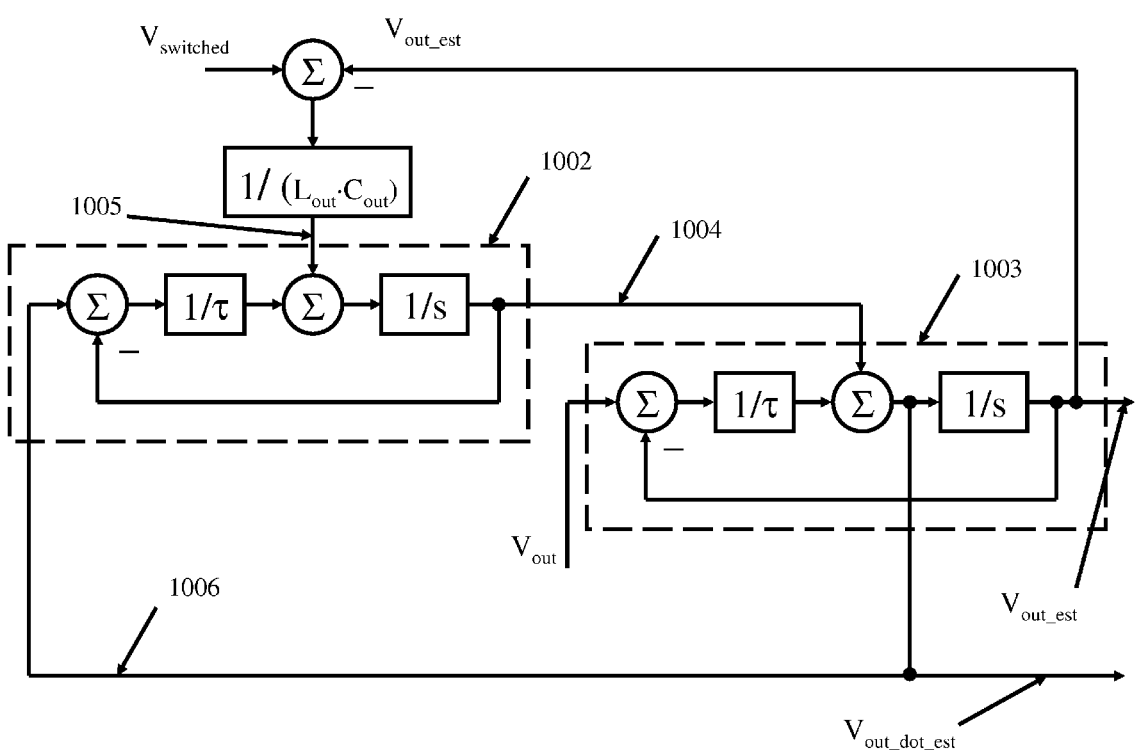
FIG. 10 illustrates a model correction structure including two integrators to provide an estimate of the output voltage of a power converter and its time derivative, constructed according to the principles of an embodiment of the invention.

Illustrated in FIG. 10 is an extension of the model correction structure in an embodiment of the invention including two integrators to provide a filtered estimate of the output voltage of a power converter $V_{out\_est}$, and its derivative $V_{out\_dot\_est}$. The filter includes two model correction structures, 1002 and 1003. A model input signal is produced at node 1005 by forming the difference between the voltage $V_{switched}$, described previously herein, and the estimate of the output voltage $V_{out\_est}$, divided by the factor $L_{out} \cdot C_{out}$. This relationship can be readily demonstrated as indicated previously from the circuit equations for the output filter inductor $L_{out}$ and the output filter capacitor $C_{out}$. A reference waveform input signal representing $V_{out\_dot\_est}$ is supplied as an input waveform as indicated in the figure to the model correction structure 1002.

The output of the model correction structure 1002 at node 1004 is provided as a model input signal to the model correction structure 1003. The model reference input signal for the model correction structure 1003 is the output voltage of the power converter, $V_{out}$ which can be sensed directly at the output of a power converter. The model correction structure 1003 produces as a secondary output an estimate of the time derivative of the output voltage, $V_{out\_dot\_est}$. This secondary output, $V_{out\_dot\_est}$, is the reference input signal needed by the model correction structure 1002.

FIG. 10 the same time constant, $\tau$, is preferably used in both model correction structures 1002 and 1003. In alternative embodiments, different time constants can be used for $\tau$ in each model correction structure.

The filter structure described with reference to FIG. 10 is preferably used in conjunction with the optimal feedback controller described hereinabove. Illustrated in FIG. 4 is the voltage $V_{switched}$ coupled to the filter 402, in an embodiment of the invention.

In an alternative embodiment, the model-referenced filtering structure described with reference to FIG. 10 can be generally used with other control architectures to provide accurate and fast time response for an estimate of a state-vector component of a switch-mode power converter to provide improved power converter performance.

Figure 11:
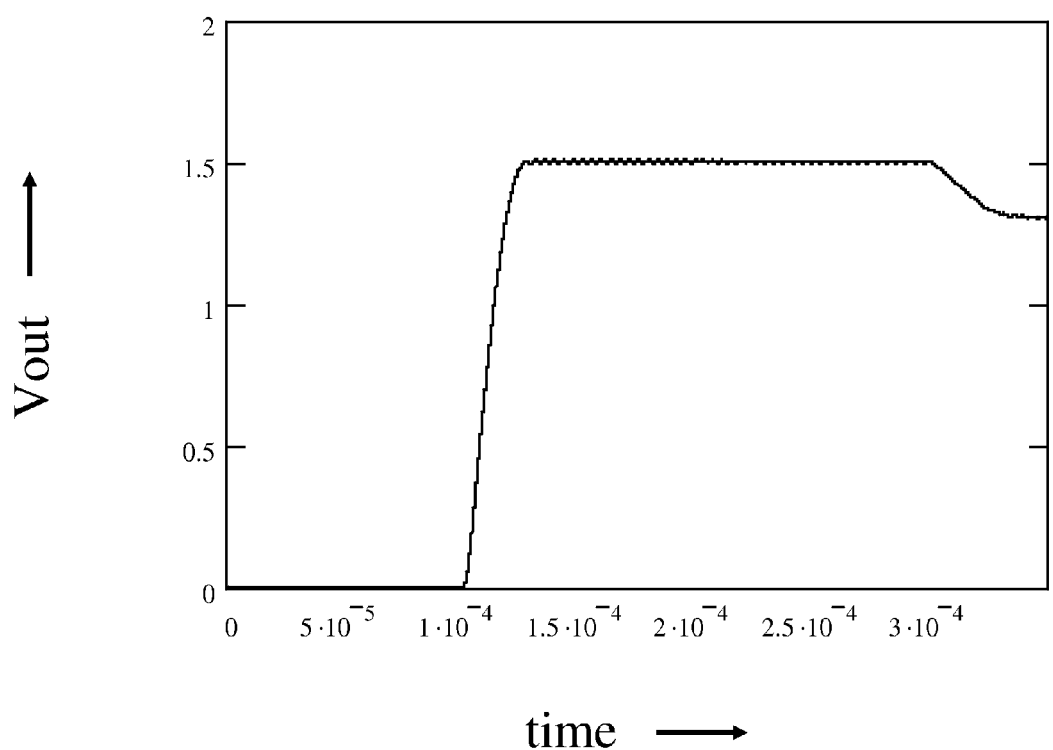
FIG. 11 illustrates a graph showing the result of simulating the output voltage of a power converter for the circuit illustrated in FIG. 4.

FIG. 11 illustrates a graph showing the result of simulation of the circuit in FIG. 4 controlled by a process represented by equation (10), and including the model-referenced filter represented in FIG. 10. The simulation was performed for the following circuit and simulation values:

$C_{out}$=20 µF
$L_{out}$=10 µH
$R_{ESR}$=15 mΩ (ESR of the output capacitor)
$V_{in}$=5 V
$\delta T$=250 ns (delay factor)

The initial value of $R_{load}$ is 1Ω, which is decreased to 50 mΩ at time t=200 µs. The step size for integrating the differential equations of the circuit is 10 ns. The filtering time constants, $\tau$, were 2 µs, which correspond to filter poles at about 80 kHz.

The initial desired output voltage is 0 volts. The desired output voltage $V_{ref}$ is then increased in a step change at the time t=100 µs to 1.5 volts. Desired output voltage is then reduced in a step change at the time t=300 µs to 1.3 volts. As indicated in the figure, the output voltage responds immediately and without overshoot to the desired voltage levels, following an essentially optimal trajectory to the desired end-point voltages with a substantially zero time derivative. The switching frequency for steady-state operation is 250 kHz, which was controlled by superimposing a triangular waveform with an amplitude of 0.01 mV on the sensed output voltage $V_{out}$ as well as the delay factor $\delta T$=250 ns.

A small ripple voltage superimposed on the steady-state voltage levels of 1.5 V and 1.3 V is observable in FIG. 11. The apparent triangular ripple voltage during the transitions to the steady-state voltage levels are only artifacts of the graphical representation and are not present in the simulation.

Figure 12:
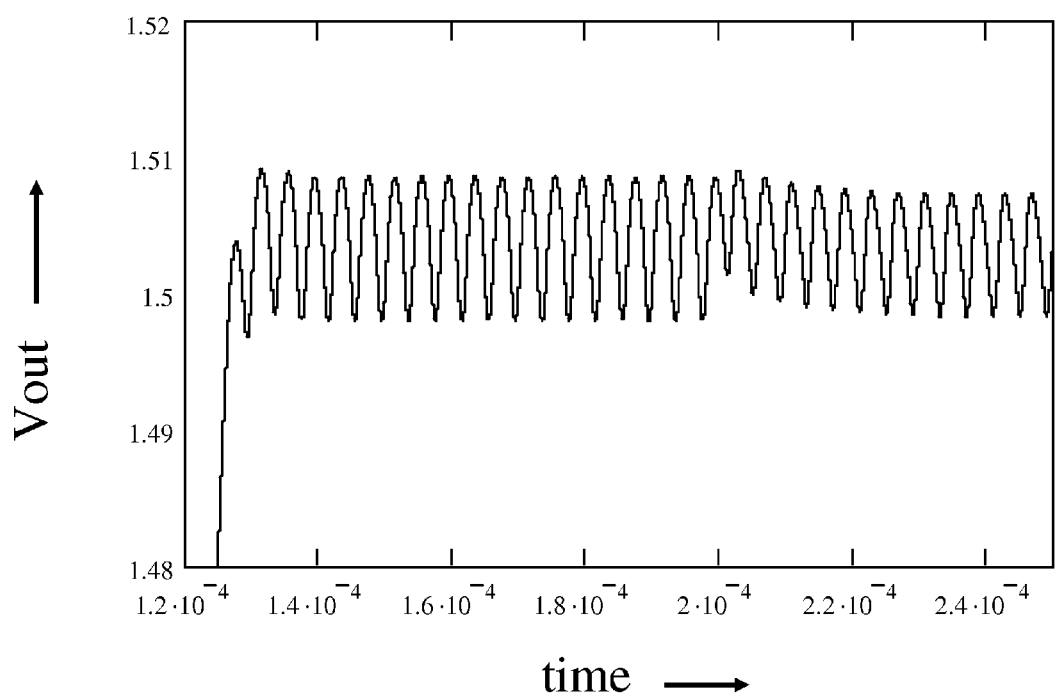
FIG. 12 illustrates a graph showing an expanded-scale plot of simulating the output voltage of a power converter for the circuit illustrated in FIG. 4.

Turning now to FIG. 12, illustrated is a highly expanded-scale plot of the output voltage $V_{out}$ at the completion of the transition to 1.5V at about 125 µs. As can be seen in the figure, substantially no overshoot is produced, and a steady-state switching frequency is initiated, as illustrated by the symmetry of the output ripple voltage. At the time of 200 µs, the load resistance is stepped from 1Ω to 0.05Ω. A small disturbance in the ripple voltage waveform is visible, but no substantial change in output voltage is evident.

Figure 13:
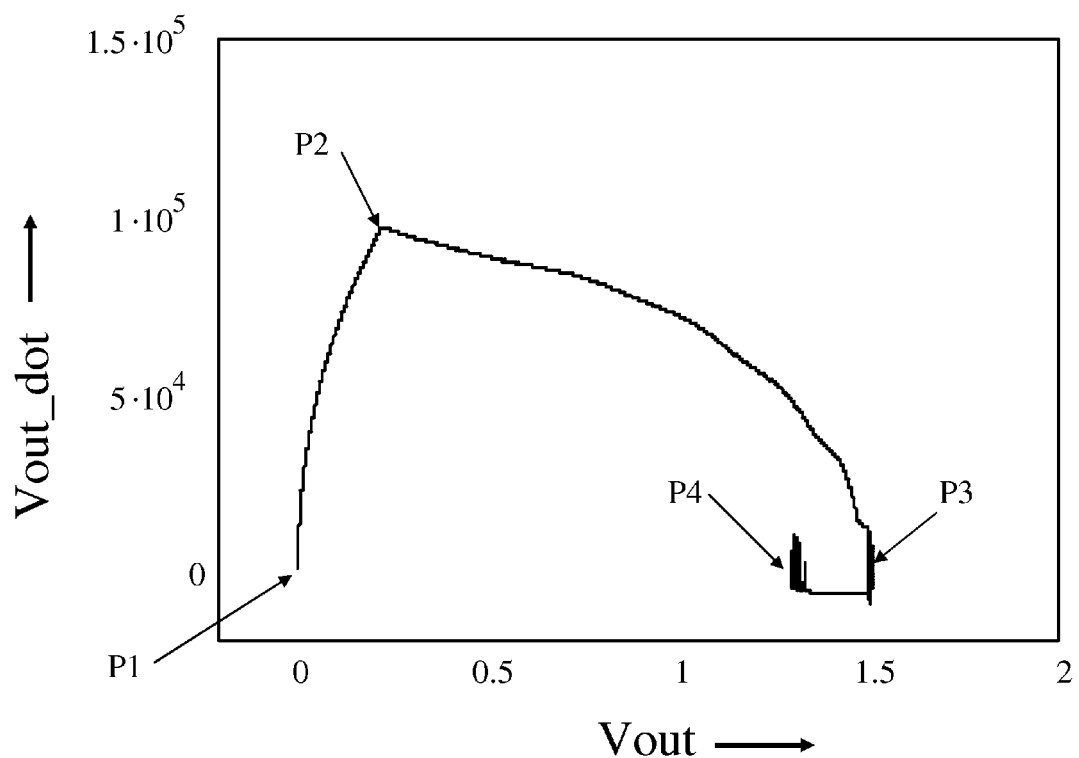
FIG. 13 illustrates a plot of the state-vector trajectory of the output voltage of a power converter and its time derivative for the circuit illustrated in FIG. 4.

Turning now to FIG. 13, illustrated is a plot of the state-vector trajectory of the output voltage $V_{out}$ on the horizontal scale, and its time derivative $V_{out\_dot}$ on the vertical scale for the simulation conditions described with reference to FIG. 10. As indicated in FIG. 13, the state-vector trajectories follow curves that are substantially ellipses. The path of the state-vector trajectory begins at the point P1, which is the initial output voltage of 0 V, and proceeds, beginning at time t=100 µs, to the point P2 with the voltage $V_{switched}$ set by the controller to the input voltage $V_{in}$=5 V. At the point P2, the voltage $V_{switched}$ is set to zero by the controller, and the trajectory arrives at the end point P3, providing 1.5 V output voltage $V_{out}$ with a substantially zero time derivative. At time t=300 µs, the desired output voltage is reduced to 1.3 V, and the state-vector trajectory then arrives at the end point P4, again with substantially zero time derivative. Limit cycles are observable in the figure at the points P3 and P4. Again, the apparent triangular ripple effects in the graph during the major voltage transitions are artifacts of the graphical representation, and are not present in the simulation.

Figure 14:
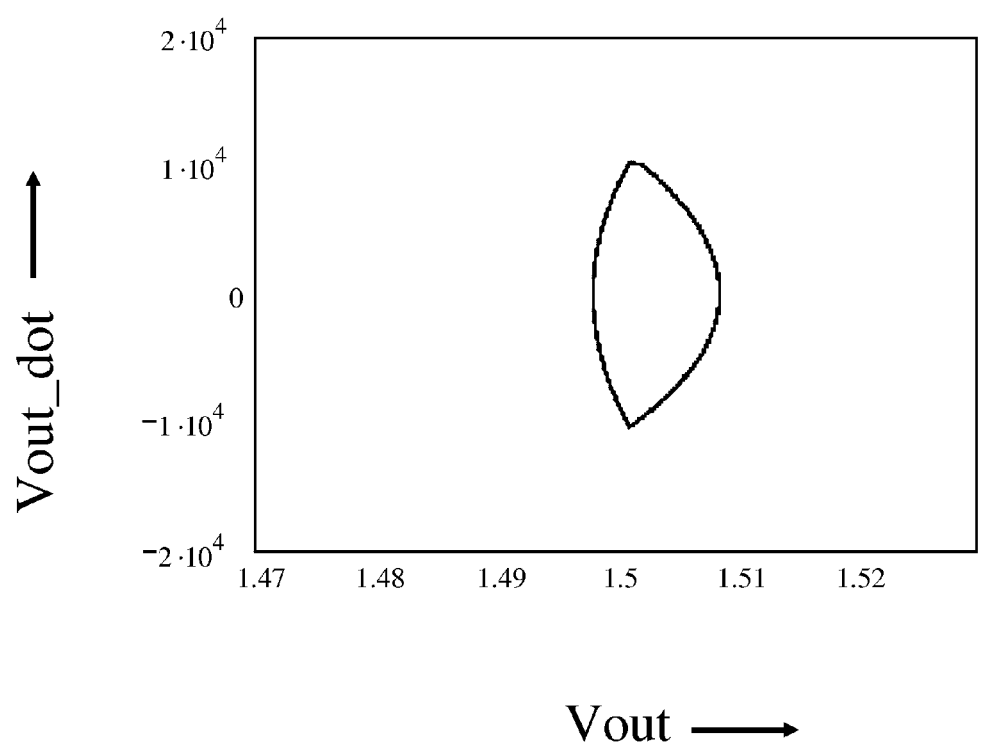
FIG. 14 illustrates a graph of several cycles of a limit cycle for the output voltage of a power converter and its time derivative for the circuit illustrated in FIG. 4.

FIG. 14 illustrates an expanded-scale graph of several cycles of the limit cycle for the output voltage and its time derivative about the point P3, (1.5 V, 0), illustrating a substantially stable limit cycle. A peak-to-peak ripple voltage (measured horizontally in the figure) of about 10 mV is apparent.

Figure 15:
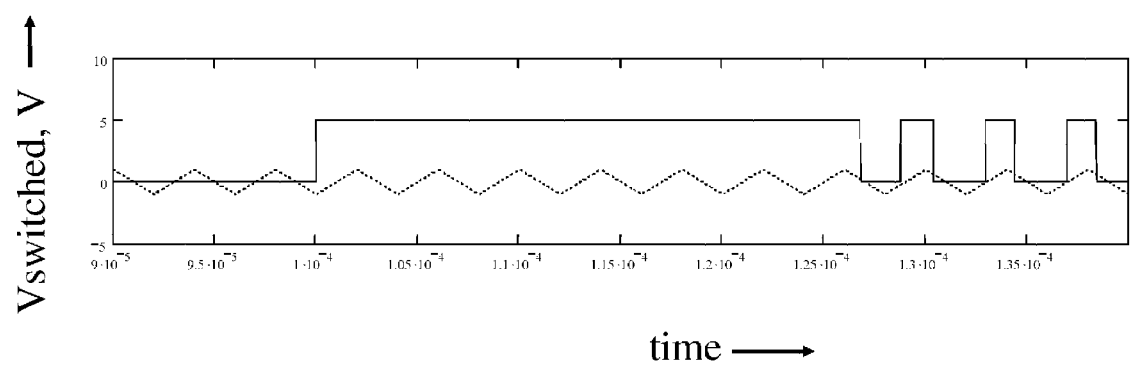
FIG. 15 illustrates a graph of the voltage $V_{switched}$ at the left node of the inductor $L_{out}$, for the circuit illustrated in FIG. 4.

FIG. 15 illustrates a plot of the voltage at the node $V_{switched}$ from a point in time just before the desired voltage is raised in a step to 1.5V at 100 µs until steady-state switching occurs at about 130 µs. Superimposed in the graph is a dotted triangular voltage waveform time aligned to the additive triangular voltage waveform superimposed on the sensed output voltage. This superimposed triangular waveform has a period corresponding to a switching frequency of 250 kHz. The steady-state switching frequency of the power converter is synchronized with the superimposed waveform as is evident in the figure.

Figure 16:
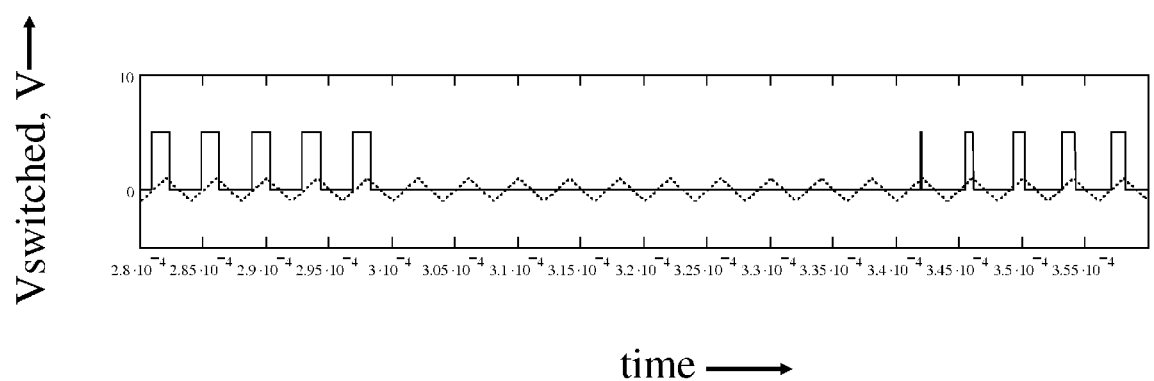
FIG. 16 illustrates a graph of the voltage $V_{switched}$ at the left node of the inductor $L_{out}$, for the circuit illustrated in FIG. 4.

Illustrated in FIG. 16 is the voltage at the node $V_{switched}$ beginning at a time shortly before the desired output voltage is dropped from 1.5 V to 1.3 V. During the period of time from 300 μs to about 340 μs, the switching action of the power converter ceases. The power converter switching frequency before and after this time interval is 250 kHz, as evident in the figure from the dotted triangular waveform with a frequency of 250 kHz.

Figure 17:
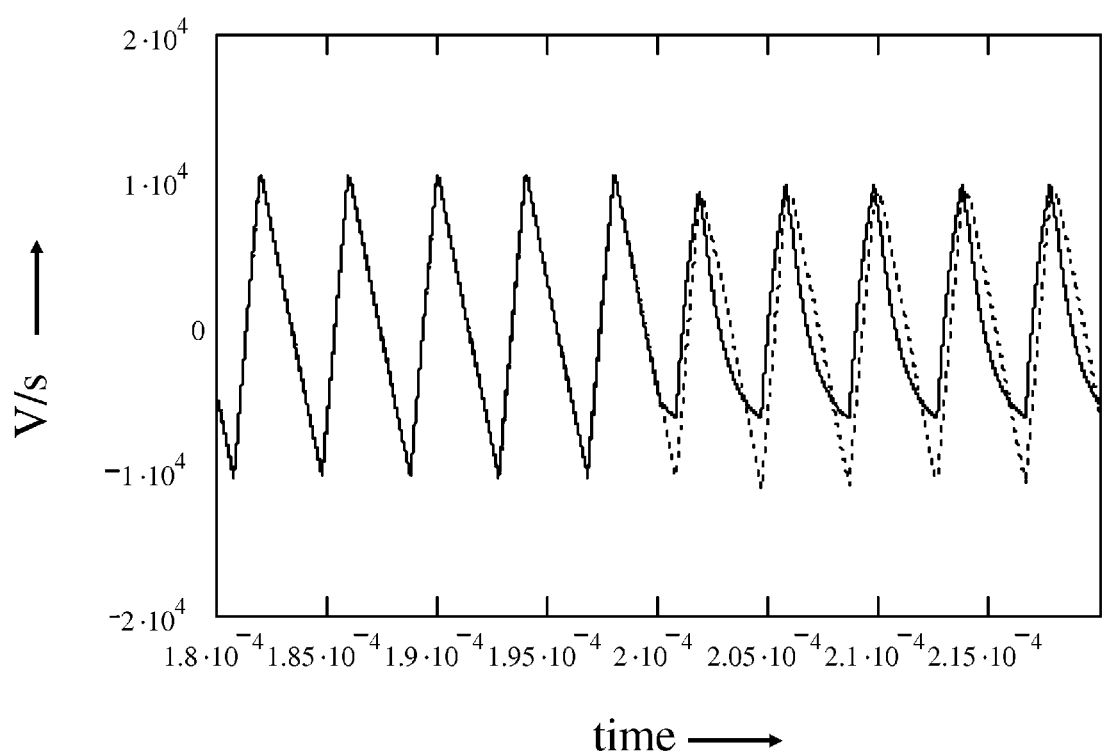
FIG. 17 illustrates the estimated and simulated time derivative of the output voltage for the circuit illustrated in FIG. 4.

FIG. 17 illustrates the sensed and simulated derivative with respect to time of the output voltage of the power converter. The simulated waveform is the solid line in the figure, and the estimated waveform using the filter architecture described with reference to FIG. 10 is the dotted waveform. Recall that at time 200 μs, the output load resistance is changed from 1Ω to 0.05Ω. The filter in this simulation does not model the output load resistance. When the output load resistance is large, before 200 μs, the filtered waveform and the simulated waveform track each other substantially temporally aligned, confirming thereby the operation of the filter structure described with reference to FIG. 10.

Figure 18:
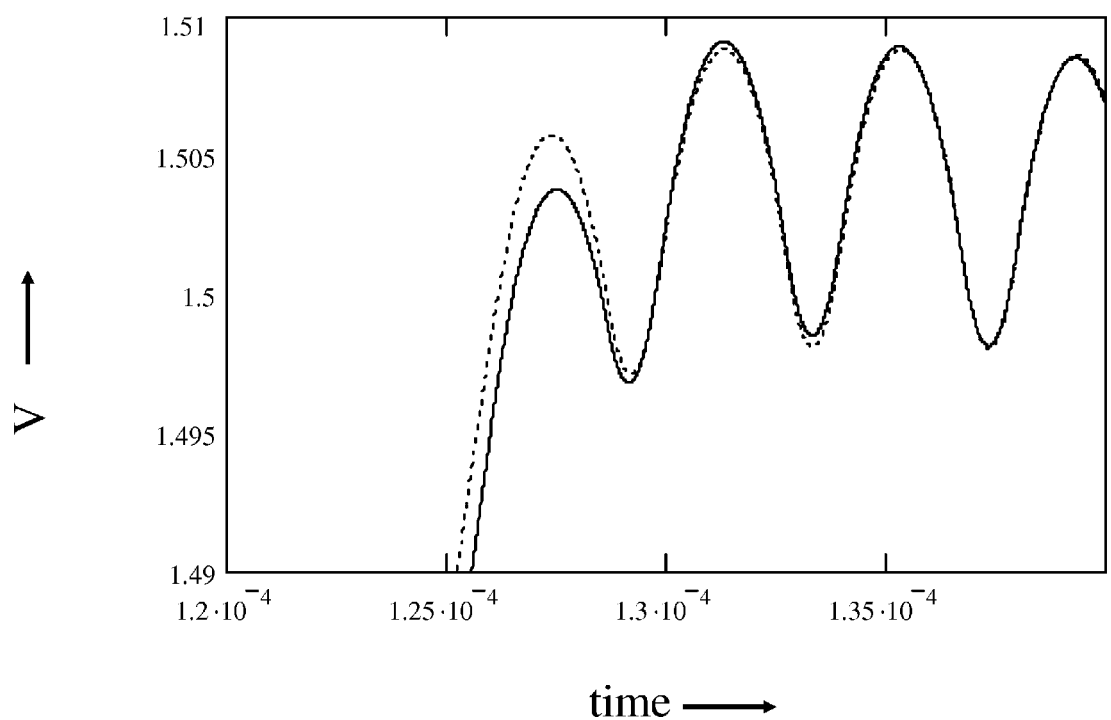
FIG. 18 illustrates the estimated and simulated output voltage for the circuit illustrated in FIG. 4.

Turning now to FIG. 18, illustrated are the simulated and estimated output voltage waveforms during a time interval when the output voltage approaches the desired voltage level of 1.5 V. Again, the simulated waveform in the figure is the solid line, and the estimated waveform using the filter architecture described with reference to FIG. 10 is the dotted waveform. Recognizing the greatly expanded vertical scale in the figure, a high level of agreement between the two waveforms is evident.

The model-referenced filter that estimates the state vector in an embodiment of the present invention need not be coupled to the voltage $V_{switched}$ such as illustrated in FIG. 4 to model the state vector of an output filter. A power converter input voltage $V_{in}$ can be estimated using an average on time, D, of a power switch (corresponding to "duty cycle" of a traditional switch-mode controller, which is known or computable by the controller because the controller controls the on and off times of a power switch such as $Q_{main}$), the sensed power converter average output voltage $V_{out}$, and an estimate of power converter efficiency η. For example, the equation $$V_{in} = V_{out}/(D \cdot \eta)$$

provides an estimate of the input voltage $V_{in}$ for the circuit illustrated in FIG. 4. Thus, the periods of time that the voltage $V_{switched}$ is substantially equal either to the input voltage $V_{in}$ or to zero volts is known or determinable by the controller. Similar equations representing circuits such as the active clamp topology illustrated in FIG. 7, including the effect of a tapped or untapped secondary winding and various transformer turns ratios, can be readily derived using analytical techniques well known in the art.

The average on time D of a power switch can be estimated during periods of steady-state power converter operation, or a filtering process can be employed to attenuate the effects of transients on an estimate of input voltage, which is generally slowly varying in many applications. For example, a filtering process such as represented by the equation $$Vin_{n+1} = (1-\alpha) \cdot Vin_n + \alpha \cdot Vin_{sensed}$$

where $Vin_{n+1}$ represents an estimate of input voltage at cycle n+1, $Vin_n$ represents an estimate of input voltage at the previous cycle n, $Vin_{sensed}$ represents a currently sensed input voltage, e.g., as computed from the previous equation using $V_{out}$, D, and η, and α is a weighting parameter (a "time constant") that might be, for example, 0.1.

Figure 19:
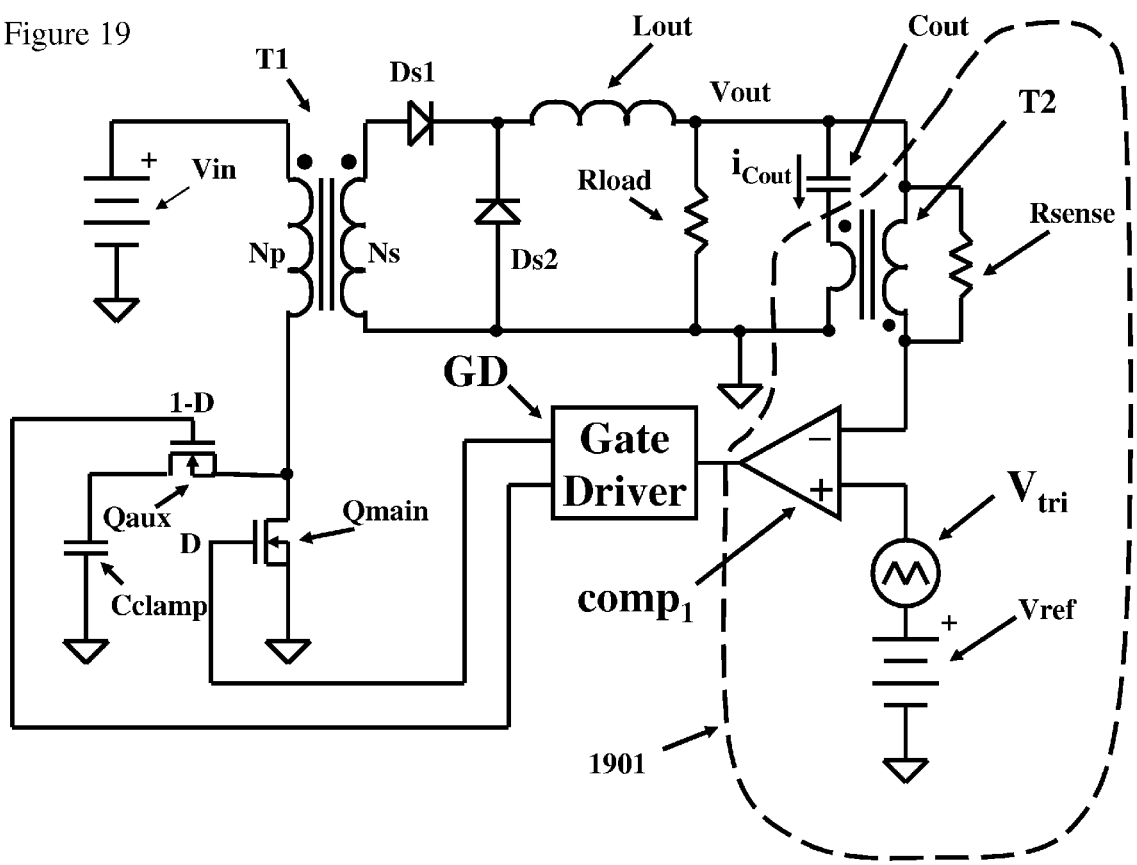
FIG. 19 illustrates an active clamp power converter controlled by a controller, constructed according to the principles of the present invention.

Turning now to FIG. 19, illustrated is an active clamp power converter controlled by a controller 1901, constructed according to the principles of the present invention. The active clamp topology was previously illustrated and described hereinabove with reference to FIG. 7, using the same reference designations in FIG. 7. In FIG. 19, the output voltage Vout is sensed at the node "Vout". A current transformer T2 is coupled in series with the output capacitor Cout to sense the current $i_{Cout}$ in the output capacitor. The current $i_{Cout}$ in the output capacitor is a measure of the time derivative of the output voltage Vout from the equation $$\frac{i_{Cout}}{Cout} = \frac{d}{dt}(Vout).$$

The transformer T2 in this exemplary embodiment has a primary-to-secondary turns ratio of 1:50 and a magnetizing inductance referenced to the primary winding of 1 μH, with a 12Ω sense resistor Rsense coupled across the secondary winding thereof. The 1:50 turns ratio of the transformer "reflects" the resistor Rsense to the primary winding where it appears as an equivalent 4.8 mΩ resistor in series with the capacitor Cout. Thus, the transformer T2 and the sense resistor Rsense are operative as a transresistance amplifier with transresistance gain $$Rsense \cdot (Npri/Nsec) = 0.24\Omega,$$

i.e., the ratio of the output voltage to the input current, where Npri and Nsec are the number of turns of the primary and secondary windings, respectively, of the transformer T2.

An alternative to measuring a current in an output capacitor is to include a small series-coupled sense resistor in series with the capacitor in conjunction with an operational amplifier to sense a voltage developed thereacross. Further alternative methods to estimate the current in an output capacitor include coupling a circuit in parallel with the output capacitor and measuring a current in such parallel-coupled circuit as described, for example, by J. J. Boylan, et al., in U.S. Pat. No. 6,249,447, "System and Method for Determining Output Current and Converter Employing the Same," previously cited hereinabove. Of course, an output capacitor can be formed with several capacitors coupled in parallel, the current in one of them measured with a current-sensing arrangement, and the current in the parallel combination estimated with a scaling factor which may include frequency-dependent elements to account for impedance differences in different parallel paths.

The voltage developed across the resistor Rsense (or by other capacitor current-sensing means) is coupled in series with the output voltage Vout in the sense indicated in the figure by the dot convention for the transformer T2, and the summed voltage of Vout and the voltage produced across Rsense are coupled to the inverting input of comparator $comp_1$. The noninverting input of comparator $comp_1$ is coupled to a 250 kHz triangular waveform generator $V_{tri}$ with peak-to-peak amplitude 300 mV. A reference voltage Vref of 5 volts is coupled in series with the triangular waveform generator to the noninverting input of comparator $comp_1$. In an alternative embodiment, the triangular waveform generator $V_{tri}$ is coupled in series with the inverting input of comparator $comp_1$. In a further alternative embodiment, the reference voltage Vref, with its sign reversed, is coupled in series with the inverting input of comparator $comp_1$. In a further alternative embodiment, a sinusoidal waveform generator, preferably with peak-to-peak amplitude of 0.3 volt, is coupled in series with the inverting input of comparator $comp_1$. Thus, the comparator $comp_1$ in conjunction with the voltages coupled to its inputs forms a straight-line partition of a state-vector plane for an active clamp power converter with state-vector coordinates Vout and time derivative of Vout as represented by the current in the output capacitor Cout. In a preferred embodiment, the comparator $comp_1$ includes positive feedback between its output and input, i.e., hysteresis to prevent repeated high-frequency switching when both the inverting and noninverting inputs have essentially equal voltages.

The output voltage of comparator $comp_1$ is coupled to a gate driver GD that produces gate drive signals for the power switches Qmain and Qaux of the active clamp converter. In a preferred embodiment, a gate driver includes circuitry to provide a brief delay between turn off of one power switch and turn on of the other, using circuit techniques well known in the art. In a further preferred embodiment, the gate driver includes metallic circuit isolation between its input and output to preserve metallic circuit isolation provided by transformer T1.

A PSpice® simulation of the circuit illustrated in FIG. 19 was made utilizing the following parameters:
Vin=25 V
turns ratio, Np:Ns, of transformer T1: 2.5:1
Lout=10 µH
Cout=20 µF
Cclamp=6 µF
Rload=1Ω
turns ratio, Npri:Nsec, of transformer T2: 50:1
magnetizing inductance (ref.pri) of transformer T2: 1 µH
Rsense 12Ω
"Vtri"=250 kHz sinusoid, 0.3 V peak-to-peak
Vref=5 V, with a step change to 3 V The simulation was run producing graphical results substantially similar in character to those illustrated in FIGS. 11-18. The circuit provided a deadbeat output voltage response without voltage overshoot and without delay to step changes in the reference voltage Vref. Substantial variation of the voltage across the clamp capacitor Cclamp was observable in the simulation with insubstantial effect on control of the output voltage. The simulation included a small amount of positive feedback around the comparator $comp_1$ to prevent "contact bounce" in the control the process.

The circuit illustrated in FIG. 19 can be further improved in an embodiment of the present invention by providing a nonlinear resistance in place of the current sensing resistor Rsense to represent portions of ellipses or other nonlinear curves. A nonlinear resistance can be formed using diodes in series and in parallel with resistors, as well as other nonlinear circuit elements, using techniques well known in the art. Further nonlinear circuit elements such as a squaring circuit using a Gilbert multiplier can also be used, such as the multiplier described by Barrie Gilbert in the paper entitled "A Precise Four-Quadrant Multiplier with Subnanosecond Response," IEEE Journal of Solid-State Circuits, Vol. SC-3, No. 4, December 1968, which is hereby referenced and included herein. The partition can be rotated relative to the state-plane coordinate axes to represent a resistive load on the power converter.

Figure 20:
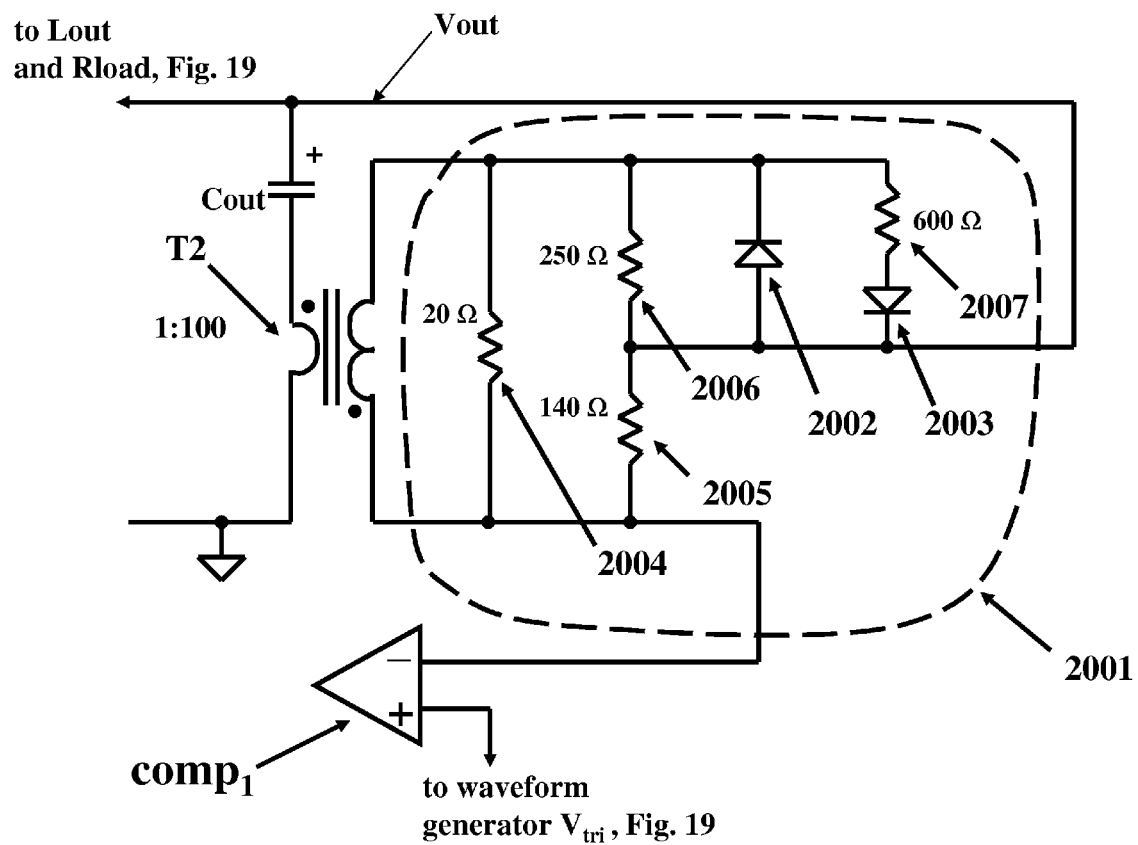
FIG. 20 illustrates a nonlinear resistor-diode network, constructed according to the principles of the present invention, that partitions a state-vector plane with a nonlinear curve.

Turning now to FIG. 20, illustrated is a nonlinear resistor-diode network 2001, including resistors 2004, 2005, 2006, and 2007 and diodes 2002 and 2003, coupled to the secondary of transformer T2 in place of the resistor Rsense illustrated in FIG. 19. Exemplary resistor component values are indicated on the figure. Network 2001 in conjunction with transformer T2 is operative as a nonlinear transresistance amplifier, the output of which is summed with the output voltage Vout and coupled to comparator $comp_1$. The network 2001 generates a nonlinear current-voltage curve similar to the curve AOB illustrated and described with reference to FIG. 6 that partitions the state-vector plane of the power converter output filter into two regions, providing thereby an analog control structure for a power switch, constructed according to the principles of the present invention. The components in network 2001 can be selected to "tune" a controller response for a particular application, such as a requirement to rapidly change a bias voltage for a microprocessor operable in a plurality of processing states.

Thus, a feedback controller for a switch-mode power converter has been described that can provide a substantially optimal control signal for an abrupt change in a desired operating point. The controller advantageously provides a "symmetrical control response" in the sense of a control arrangement in which a power switch is turned on when a sensed state vector lies in one region of a state-vector plane, and the power switch is turned off when the sensed state vector lies in another region of a state-vector plane. Control arrangements of the prior art turn a power switch on with a clock signal, and turn the power switch off when a sensed condition is satisfied. A model-referenced filter for the output voltage has also been described that can provide an accurate estimate of the power converter output voltage with minimal time lag, and an accurate estimate of the time derivative of the output voltage substantially time aligned with the estimate of output voltage. In an alternative embodiment, the time derivative of the output voltage is estimated by sensing the current in an output capacitor. The controller includes a partition in the plane representing the output state vector of the power converter, and a modulating signal such as an additive signal to control the steady-state switching frequency. The partition can be a curved partition, which can be approximated with a straight line. If the state vector falls on one side of the partition, a power switch is turned on. If it falls on the other side, the power switch is turned off. The partition may advantageously include corrective elements such as positive feedback around a comparator, an added waveform with a desired switching frequency, and/or other delay elements to facilitate a controller response and to provide limit cycle operation at a desired switching frequency about a steady-state characteristic of the power converter. The filter includes a model which may be coupled to a node of the power converter to provide a signal for an integrator that in turn generates an estimate of the time derivative of the output voltage. The time derivative of the output voltage is further integrated to provide an estimate of the output voltage itself. Feedback paths correct the estimated voltage and its derivative with a time constant chosen in view of possible drift of integrators and possible noise in sensed signals.

The control structure described above can be applied to multiphase power converters using techniques well-known in the art to produce control signals for a plurality of phases. The control structure can be implemented using analog and/or digital circuit arrangements.

Although the present invention has been described in detail and with reference to particular embodiments, those skilled in the art should understand that various changes, substitutions and alterations can be made as well as alterative embodiments of the invention without departing from the spirit and scope of the invention in its broadest form as defined by the appended claims. For example, many of the topology and circuit designs discussed above can be implemented in different methodologies and replaced by other topology and circuit designs, or a combination thereof, to advantageously form power converters providing an improved filter or controller response as described herein.

What is claimed is:

1. A power converter, comprising:
   a power switch;
   an output filter coupled to said power switch to receive a switched input voltage and produce an output characteristic of said power converter; and
   a controller coupled to said power switch and to said output filter, wherein said controller estimates a state vector of said output filter comprising at least two state-vector components and controls said output characteristic with a nonlinear partition of a state-vector plane, said partition separating said state-vector plane into a first region and a second region, wherein said controller turns said power switch on when said state vector lies in said first region and off when said state vector lies in said second region.

2. The power converter as recited in claim 1 wherein said partition passes through a point representing a desired output characteristic of said power converter.

3. The power converter as recited in claim 1 wherein said partition is formed with ellipses.

4. The power converter as recited in claim 1 wherein said partition includes a component of said state vector offset with a waveform having a desired switching frequency of said power converter.

5. The power converter as recited in claim 1 wherein said partition is sensed with a process including hysteresis.

6. The power converter as recited in claim 1, wherein said controller is further coupled to said switched input voltage.

7. The power converter as recited in claim 1 wherein said controller produces a modeled state-vector response of said output filter to said switched input voltage.

8. The power converter as recited in claim 7 wherein said controller employs a difference between said modeled state-vector response and a sensed characteristic of said output filter to correct said modeled response.

9. The power converter as recited in claim 1 wherein said controller senses a current in an output capacitor to estimate a component of said state vector.

10. A method of controlling a power converter including a power switch, comprising:
    coupling an output filter to said power switch to receive a switched input voltage and produce an output characteristic of said power converter;
    coupling a controller to said power switch and to said output filter and estimating in said controller a state vector comprising at least two state-vector components of said output filter;
    separating a state-vector plane into a first region and a second region with a nonlinear partition of said state-vector plane; and
    controlling said output characteristic by turning on said power switch when said state vector lies in said first region and off said power switch when said state vector lies in said second region.

11. The method as recited in claim 10 including forming said partition so that it passes through a point representing a desired output characteristic of said power converter.

12. The method as recited in claim 10 including forming said partition with ellipses.

13. The method as recited in claim 10 including forming said partition with nonlinear functions.

14. The method as recited in claim 10 including forming said partition with a time-delayed component of said state vector.

15. The method as recited in claim 10 including forming said partition with a component of said state vector offset at a desired switching frequency of said power converter.

16. The method as recited in claim 10 further including coupling said controller to said switched input voltage.

17. The method as recited in claim 10 including producing in said controller a modeled state-vector response of said output filter to said switched input voltage.

18. The method as recited in claim 17 including employing in said controller a difference between said modeled state-vector response and a sensed characteristic of said output filter to correct said modeled response.

* * * * *